US009436556B2

(12) United States Patent
Siden et al.

(10) Patent No.: US 9,436,556 B2
(45) Date of Patent: Sep. 6, 2016

(54) CUSTOMIZABLE STORAGE SYSTEM FOR VIRTUAL DATABASES

(71) Applicant: Delphix Corp., Menlo Park, CA (US)

(72) Inventors: Christopher G. Siden, San Francisco, CA (US); Adam H. Leventhal, San Francisco, CA (US)

(73) Assignee: Delphix Corp., Menlo Park, CA (US)

( * ) Notice: Subject to any disclaimer, the term of this patent is extended or adjusted under 35 U.S.C. 154(b) by 230 days.

(21) Appl. No.: 14/322,597

(22) Filed: Jul. 2, 2014

(65) Prior Publication Data

US 2015/0019495 A1  Jan. 15, 2015

Related U.S. Application Data

(60) Provisional application No. 61/844,375, filed on Jul. 9, 2013.

(51) Int. Cl.
*G06F 17/30* (2006.01)
*G06F 11/14* (2006.01)

(52) U.S. Cl.
CPC ........ *G06F 11/1448* (2013.01); *G06F 11/1471* (2013.01); *G06F 2201/80* (2013.01); *G06F 2201/815* (2013.01); *G06F 2201/82* (2013.01)

(58) Field of Classification Search
None
See application file for complete search history.

(56) References Cited

U.S. PATENT DOCUMENTS

| | | |
|---|---|---|
| 5,819,292 A | 10/1998 | Hitz et al. |
| 7,107,385 B2 | 9/2006 | Rajan et al. |
| 7,225,204 B2 | 5/2007 | Manley et al. |
| 7,334,094 B2 | 2/2008 | Fair |
| 7,334,095 B1 | 2/2008 | Fair et al. |
| 7,340,461 B2 | 3/2008 | Vishlitzky et al. |
| 7,373,364 B1 | 5/2008 | Chapman |
| 7,386,695 B2 | 6/2008 | Fuente |
| 7,409,511 B2 | 8/2008 | Edwards et al. |
| 7,457,982 B2 | 11/2008 | Rajan |
| 7,539,836 B1 | 5/2009 | Klinkner |

(Continued)

FOREIGN PATENT DOCUMENTS

JP   2005532611 A   10/2005

OTHER PUBLICATIONS

Notice of Grounds for Rejection for Japanese Patent Application No. P2014-155597, Apr. 21, 2015, 5 Pages.

(Continued)

*Primary Examiner* — Debbie Le
(74) *Attorney, Agent, or Firm* — Fenwick & West LLP

(57) ABSTRACT

A database storage system provides replication capability that allows data from a source database and application specific data from a source application to be replicated respectively to a target database storage system and a target application, thereby creating a virtual database and a virtual application. The database storage system generates a plurality of snapshots of the virtual database at a corresponding plurality of time points and a plurality of snapshots of the virtual application at the corresponding plurality of time points. The database storage system associates the plurality of snapshots of the virtual database with the plurality of snapshots of the virtual application at the corresponding plurality of time points so as to generate a historical time-sequence of concurrent modifications to both the virtual database and the virtual application at the one or more development environments, thereby allowing concurrent read/write and rollback, of data and applications.

20 Claims, 13 Drawing Sheets

(56) References Cited

U.S. PATENT DOCUMENTS

| | | | |
|---|---|---|---|
| 7,587,563 | B1 | 9/2009 | Teterin et al. |
| 7,590,660 | B1 | 9/2009 | Richards et al. |
| 7,631,021 | B2 | 12/2009 | Sarma et al. |
| 7,743,035 | B2 | 6/2010 | Chen et al. |
| 7,757,056 | B1 | 7/2010 | Fair |
| 7,822,758 | B1 | 10/2010 | Prakash et al. |
| 7,827,366 | B1 | 11/2010 | Nadathur et al. |
| 7,856,424 | B2 | 12/2010 | Cisler et al. |
| 7,877,357 | B1 | 1/2011 | Wu et al. |
| 7,937,547 | B2 | 5/2011 | Liu et al. |
| 7,941,470 | B2 | 5/2011 | Le et al. |
| 7,996,636 | B1 | 8/2011 | Prakash et al. |
| 8,037,032 | B2 | 10/2011 | Pershin et al. |
| 8,150,808 | B2* | 4/2012 | Zha .................... G06F 17/30566 707/609 |
| 8,161,077 | B2* | 4/2012 | Zha .................... G06F 17/30592 701/1 |
| 8,280,858 | B2 | 10/2012 | Ahrens et al. |
| 8,311,988 | B2 | 11/2012 | Cisler et al. |
| 8,433,682 | B2* | 4/2013 | Ngo .................... G06F 17/30551 707/639 |
| 8,468,174 | B1* | 6/2013 | Yueh .................. G06F 17/30088 707/796 |
| 8,532,973 | B1 | 9/2013 | CaraDonna et al. |
| 8,775,663 | B1 | 7/2014 | Singh |
| 9,092,500 | B2* | 7/2015 | Varadharajan |
| 2002/0083037 | A1 | 6/2002 | Lewis et al. |
| 2008/0307345 | A1 | 12/2008 | Hart et al. |
| 2009/0222496 | A1 | 9/2009 | Liu et al. |
| 2011/0004586 | A1* | 1/2011 | Cherryholmes .... G06F 11/1469 707/682 |
| 2011/0093435 | A1* | 4/2011 | Zha .................... G06F 17/30566 707/639 |
| 2011/0093436 | A1* | 4/2011 | Zha .................... G06F 17/30592 707/639 |
| 2011/0173607 | A1* | 7/2011 | Murphey ................. G06F 8/71 718/1 |

OTHER PUBLICATIONS

Kakinoki, T., et al., "Query Language for Enterprise Data Integration in SaaS Environment," Institute of Electronics, Information and Communication Engineers, Data Engineering Workshop Collected Papers No. 19, (DEWS 2008 C3-1), Japan, The Institute of Electronics, Information and Communication Engineers, Data Engineering Research Committee, Apr. 7, 2008, 4 Pages. (With English Abstract).

Boppana, U., "Using FlexClone to Clone Files and LUNs," NetApp Technical Report, Mar. 2010, 32 Pages.

Creek, T., "Applications for Writeable LUNs and LUN Cloning in Oracle Environments," NetApp, Technical Report, Jun. 2003, 10 Pages.

Degwekar, A., "Using SnapMirror with SnapDrive for UNIX," NetApp Technical Report, 2007, 11 Pages.

GMANE, Discussion regarding "File level snapshots in ZFS," From the zfs-discuss@opensolaris.org mailing list, Mar. 30, 2007, 1 Page, Can be retrieved at <URL:http://article.gmane.org/gmane.os.solaris.openolaris.zfs/7759/match=snapshot>.

GMANE, Discussion regarding "ZFS Clone Promotion [PSARC/2006/303 Timeout: May 12, 2006]," From the zfs-discuss@opensolaris.org mailing list, May 9, 2006, 2 Pages, Can be retrieved at <URL:http://article.gmane.org/gmane.os.solaris.openolaris.zfs/194/match=clone>.

GMANE, Discussion regarding "ZFS Clone Promotion [PSARC/2006/303 Timeout: May 12, 2006]," From the zfs-discuss@opensolaris.org mailing list, May 10, 2006, 1 Page, Can be retrieved at <URL:http://article.gmane.org/gmane.os.solaris.zfs/224/match=cloning>.

GMANE, Discussion regarding "ZFS Clone Promotion [PSARC/2006/303 Timeout: May 12, 2006]," From the zfs-discuss@opensolaris.org Mailing list, May 10, 2006, 1 Page, Can be retrieved at <URL:http://article.gmane.org/gmane.os.solaris.opensolaris.zfs/229/match=zfs+clone+promotion>.

GMANE, Discussion regarding "ZFS snapshot improvement," From the zfs-discuss@opensolaris.org mailing list, May 10, 2006, 1 page, Can be retrieved at <URL:http:article.gmane.org/gmane.os.solaris.openolaris.zfs/232/match=snapshot>.

GMANE, Discussion regarding "ZFS promotions," From the zfs-discuss@opensolaris.org mailing list, Dec. 12, 2008, 2 Pages, Can be retrieved at <URL:http://article.gmane.org/gmane.os.solaris.openolaris.zfs/22347/match=clone>.

Higgins, B., et al., "Backup and Recovery Snap Manager for SQL Server," DLA Piper, Nov. 2008, 37 Pages.

Hitz, D., et al., "File System Design for an NFS File Server Appliance," Technical Report, USENIX, Winter 1994, 23 Pages.

Jackson, J., "ZFS: The future for storage networks?; File system has massive capacity, but licensing issues and architectural concerns persist," Government Computer News, Media, Inc., Jun. 25, 2007, 2 Pages.

Kay, D., "Working with ZFS Snapshots," Solaris 10 How-To Guides, Version 1.0, Sun Microsystems, Inc., Jan. 5, 2009, 8 Pages.

Kilvansky, M., "A Thorough Introduction to FlexClone Volumes," NetApp, Technical White Paper, Oct. 2004, 35 Pages.

Lal, J., et al., "DB2: Cloning a Database using NetApp FlexClone Technology," NetApp, Apr. 30, 2006, 60 Pages.

Merrill, J., et al., "SnapVault Best Pratices Guide," NetApp Technical Report, 2008, 29 Pages.

Nadgir, N., "Databases and ZFS," Oracle Blog, Sep. 25, 2006, 8 Pages, Can be retrieved from <URL:http://blog.oracle.com/realneel/entry/zfs_and_databases>.

Network Appliance, Inc., "Data ONTAP 7.2 Commands: Manual Page Reference, vol. 1,"0 May 16, 2008, 615 Pages.

Network Appliance, Inc., "NetApp Data Management for Decision Support Systems," 2005-2010, 4 Pages.

Network Appliance, Inc., "Flexvol and Flexclone Software," 2006, 2 Pages.

Network Appliance, Inc., "SnapManager 3.0 for Oracle Installation and Administration Guide," Nov. 2008, 294 Pages.

Network Appliance, Inc., "SnapManager 2.2 for Oracle Installation and Administration Guide," Nov. 2007, 310 Pages.

Network Appliance, Inc., "SnapManager 5.0 for Microsoft SQL Server Installation and Administration Guide," Oct. 2008, 492 Pages.

Network Appliance, Inc., "Network Appliance Snapmirror Software," 2006, 2 Pages.

ORACLE, "Oracle Database Backup and Recovery User's Guide," 11g Release 1(11.1), Aug. 2008, 598 Pages.

Osuna, A., "An Introduction to FlexClone Volumes" Redbooks, IBM, 2006, 50 Pages.

Osuna, A., "Using IBM DB2 UDB with IBM System Storage N series" Redbooks, IBM, Dec. 2006, 136 Pages.

Osuna, A., "Data Protection Strategies in IBM System Storage N Series" Redbooks, IBM, Jun. 2008, 90 Pages.

Osuna, A., "IBM System Storage N Series SnapMirror" Redbooks, IBM, Jul. 2006, 124 Pages.

Osuna, A., "IBM System Storage N Series SnapVault Best Practices Guide" Redbooks, IBM, 2007, 54 Pages.

Patel, D., et al., "Rapid Database Development and Deployment," NetApp White Paper, Mar. 2007, 11 Pages.

Patterson, H., et al., "SnapMirror: File System Based Asynchronous Mirroring for Disaster Recovery," USENIX Association, Proceedings of the FAST 2002 Conference on File and Storage Technologies, Jan. 28-30, 2002, 14 Pages.

Schuettinger, S., "NetApp Technical Report—Rapid Deployment of Oracle Database 11g Using VMWare Infrastructure and NetApp Flexclone," NetApp, Jan. 2008, 24 Pages.

Schuettinger, S., "Helping DBAs Become More Efficient NetApp Efficiency and Manageability Advantages," NetApp White Paper, Jul. 2009, 12 Pages.

Sun Microsystems, Inc., "ZFS The File System of the Future," 19 Pages. [Publication date is unknown].

Sun Microsystems, Inc., "Solaris ZFS Administration Guide," Aug. 2006, 164 Pages.

(56) References Cited

OTHER PUBLICATIONS

Sun Microsystems, Inc., "Solaris ZFS Administration Guide," Mar. 2009, 292 Pages.
Sun Microsystems, Inc., "System Administration Guide: Virtualization Using the Solaris Operating System," Oct. 2009, 562 Pages.
Syncsort Incorporated, "Near-Instant Oracle Cloning with Syncsort AdvancedClient Technologies," Synscort, White Paper, 2007, 12 Pages.
Syncsort Incorporated, "Syncsort Backup Express Advanced Recovery for NetApp," Synscort, 2008, 12 Pages.
Watanabe, S., "Solaris 10 ZFS Essentials," Sun Microsystems, 2010, 146 Pages.
Wikipedia, "ZFS," Last Modified Jul. 22, 2014, 14 Pages.
"ZFS Snapshot and Amazon S3 (Part 2 of 2)," PAUL'S Blog 3.0 (Release Candidate), Oracle, 2007, 5 Pages.
Chapman et al., "SnapMirror® Best Practices Guide, NetApp, Inc. Technical Report TR-3446," Apr. 2006, 63 Pages.
Edwards, et al., "FlexVol: Flexible, Efficient File Volume Virtualization in WAFL," Jun. 22, 2008, 22 Pages.
IBM, "IBM System Storage SAN Volume Controller Software V4.3.0 introduces space-efficient VDisks and VDisk mirroring," IBM United States Announcement 208-114, May 13, 2008, 17 Pages.
Microsoft, Microsoft Developer's Network, "Pages and Extents," Microsoft Corporation ("Pages and Extents") Sep. 2007, 2 Pages.
Mullins, "Excerpts of DB2 Developer's Guide, Fifth Ed." May 2004, 5 Pages.
NETAPP, 2007 NetApp, Inc., Data ONTAP 7.1 Data Protection Online Backup and Recovery Guide, NetApp Technical Doc, Jan. 12, 2007, pp. 508.
NETAPP, "Datasheet FlexClone," NetApp Technical Doc, 2008, 2 Pages.
NETAPP, "Datasheet FlexVol™ and FlexClone™ Software," NetApp Technical Doc, 2004, 2 Pages.
NETAPP, "Datasheet Netapp SnapManager for Oracle," NetApp Technical Doc, 2008, 2 Pages.
NETAPP, "Datasheet NetApp SnapMirror," NetApp Technical Doc, 2008, 2 Pages.
NETAPP, "Datasheet NetApp Snapshot Technology," NetApp Technical Doc, 2004, 1 Page.
Ranganathan, A., and Neto, A., "Technical Report, SnapManager 3.0 for Oracle Best Practices, TR-3761" Apr. 2009, 88 Pages.
Sun Microsystems, Inc., "ZFS The File System of the Future," Apr. 27, 2009, 19 Pages.
Tate, J., et al., "Implementing the IBM System Storage SAN vol. Controller V4.3," IBM Redbook SG24-6423-06, Oct. 2008, 970 Pages.
VMWARE, Inc. and EMC Corporation, "Accelerate Oracle Database log Creation and Deployment Using VMware Infrastructure and EMC Celerra Writeable Checkpoints," Mar. 2008, 16 Pages.
VMWARE, Inc. and IBM "Using IBM® TotalStorage® Enterprise Storage Server® FlashCopy® Function with the VMware ESX 2.5 Server ("ESX IBM")," Sep. 1, 2005, 25 Pages.
VMWARE, Inc., "Using Clones to Streamline Development ("Ws5 Clones")," 2005, 9 Pages.
VMWARE, Inc., "Using VMware Infrastructure for Backup and Restore ("Esx3")," 2006, 20 Pages.
VMWARE, Inc., "Workstation 5 User's Manual ("WS5 Manual")," 2006, 492 Pages.
Declaration of Erez Zadok in Support of Petition for Inter Partes Review of U.S. Pat. No. 8,161,077, Oct. 6, 2014, 87 Pages.
Declaration of Erez Zadok in Support of Petition for Inter Partes Review of U.S. Pat. No. 8,161,077, Oct. 6, 2014, 95 Pages.
Declaration of Erez Zadok in Support of Petition for Inter Partes Review of U.S. Pat. No. 8,468,174, Oct. 23, 2014, 98 Pages.
Declaration of Erez Zadok in Support of Petition for Inter Partes Review of U.S. Pat. No. 8,468,174, Oct. 23, 2014, 99 Pages.
Declaration of Erez Zadok in Support of Petition for Inter Partes Review of U.S. Pat. No. 8,566,361, Oct. 21, 2014, 99 Pages.
Declaration of Erez Zadok in Support of Petition for Inter Partes Review of U.S. Pat. No. 8,566,361, Oct. 21, 2014, 84 Pages.
Declaration of Erez Zadok in Support of Petition for Inter Partes Review of U.S. Pat. No. 8,150,808, Oct. 2, 2014, 85 Pages.
Declaration of Erez Zadok in Support of Petition for Inter Partes Review of U.S. Pat. No. 8,150,808, Oct. 2, 2014, 78 Pages.
Declaration of Erez Zadok in Support of Petition for Inter Partes Review of U.S. Pat. No. 8,150,808, Oct. 2, 2014, 84 Pages.
Declaration of Erez Zadok in Support of Petition for Inter Partes Review of U.S. Pat. No. 8,150,808, Oct. 6, 2014, 97 Pages.
Declaration of Erez Zadok in Support of Petition for Inter Partes Review of U.S. Pat. No. 8,548,944, Oct. 7, 2014, 98 Pages.
Declaration of Erez Zadok in Support of Petition for Inter Partes Review of U.S. Pat. No. 8,548,944, Oct. 8, 2014, 98 Pages.
Petition for Inter Partes Review of U.S. Pat. No. 8,161,077, Oct. 6, 2014, 62 Pages.
Petition for Inter Partes Review of U.S. Pat. No. 8,161,077, Oct. 6, 2014, 65 Pages.
Petition for Inter Partes Review of U.S. Pat. No. 8,468,174, Oct. 23, 2014, 64 Pages.
Petition for Inter Partes Review of U.S. Pat. No. 8,566,361, Oct. 21, 2014, 66 Pages.
Petition for Inter Partes Review of U.S. Pat. No. 8,150,808, Oct. 3, 2014, 65 Pages.
Petition for Inter Partes Review of U.S. Pat. No. 8,150,808, Oct. 3, 2014, 61 Pages.
Petition for Inter Partes Review of U.S. Pat. No. 8,150,808, Oct. 7, 2014, 65 Pages.
Petition for Inter Partes Review of U.S. Pat. No. 8,548,944, Oct. 8, 2014, 66 Pages.
Petition for Inter Partes Review of U.S. Pat. No. 8,548,944, Oct. 8, 2014, 65 Pages.
Sadagopan, P., et al., "Oracle Fusion Middleware DR Solution Using NetApp Storage," NetApp Technical Report, May 2008, 38 Pages.
Final Written Decision, Before the Patent Trial and Appeal Board of United States Patent and Trademark Office, Case IPR2015-00034, U.S. Pat. No. 8,150,808 B2, Apr. 16, 2016, 100 Pages.
Final Written Decision, Before the Patent Trial and Appeal Board of United States Patent and Trademark Office, Case IPR2015-00128, U.S. Pat. No. 8,468,174 B1, Apr. 27, 2016, 74 Pages, Paper 8.
Final Written Decision, Before the Patent Trial and Appeal Board of United States Patent and Trademark Office, Case IPR2015-00128, U.S. Pat. No. 8,468,174 B1, Apr. 27, 2016, 74 Pages, Paper 61.
Final Written Decision, Before the Patent Trial and Appeal Board of United States Patent and Trademark Office, Case IPR2015-00016 & IPR2015-00019, U.S. Pat. No. 8,150,808 B2, Apr. 13, 2016, 107 Pages.
Final Written Decision, Before the Patent Trial and Appeal Board of United States Patent and Trademark Office, Case IPR2015-00014, U.S. Pat. No. 8,150,808 B2, Apr. 13, 2016, 92 Pages.
Final Written Decision, Before the Patent Trial and Appeal Board of United States Patent and Trademark Office, Case IPR2015-00025 & IPR2015-00026, U.S. Pat. No. 8,161,077 B2, Apr. 12, 2016, 94 Pages.
Final Written Decision, Before the Patent Trial and Appeal Board of United States Patent and Trademark Office, Case IPR2015-00052, U.S. Pat. No. 8,548,944 B2, Mar. 31, 2016, 25 Pages.
Final Written Decision, Before the Patent Trial and Appeal Board of United States Patent and Trademark Office, Case IPR2015-00050, U.S. Pat. No. 8,548,944 B2, Mar. 31, 2016, 26 Pages.
Final Written Decision, Before the Patent Trial and Appeal Board of United States Patent and Trademark Office, Case IPR2015-00108, U.S. Pat. No. 8,566,361 B2, Apr. 29, 2016, 61 Pages.
Final Written Decision, Before the Patent Trial and Appeal Board of United States Patent and Trademark Office, Case IPR2015-00108, U.S. Pat. No. 8,566,361 B2, May 11, 2016, 57 Pages.

* cited by examiner

CUSTOMIZABLE STORAGE SYSTEM FOR VIRTUAL DATABASES

CROSS REFERENCES TO RELATED APPLICATIONS

This application claims the benefit of U.S. Provisional Patent Application No. 61/844,375 filed Jul. 9, 2013, which is incorporated by reference in its entirety.

FIELD OF ART

This invention relates generally to databases and in particular to storage efficient systems for managing databases.

DESCRIPTION OF THE RELATED ART

Databases store data that is critical to an organization and thus form an important part of an organization's information technology infrastructure. Vendors often support various features for maintaining databases, for example, backup, restore, replication, disaster recovery, and so on. These features allow users to manage data stored in the database. For example, if there is failure of a database, a user can recover the data present in a previous consistent state of the database.

However, users of databases often use large amount of data that is associated with the database but is not stored within the database. For example, users of databases often use applications based on databases that are associated with large amount of data stored outside the database. Data of applications using database includes executable files, configuration information, documents processed by the application, images, other media files, and so on. This data is stored outside the database and is not managed by the features of the database. For example, a user may recover a prior consistent state of a database after a disaster recovery, but the user may not able to restore the corresponding state of the data associated with the application using the database. Accordingly, techniques for maintaining data are often inadequate as far as management of data associated with the database that is not stored within the database.

SUMMARY

Embodiments create virtual application environments for a point in time associated with a source application environment. An application environment comprises an application configured to access a database along with the database. The application includes executable files of the application and data used by the application that is stored outside the database, for example, documents, images and the like. A database storage system receives point-in-time copies of the source application environment by receiving point in time copies of the source application and point in time copies of the source database. The database storage system stores data blocks for the point-in-time copies of the source application such that at least some of the stored data blocks are associated with multiple point-in-time copies of the source application. The storage system also stores data blocks for point-in-time copies of the source database such that at least some of the stored data blocks are associated with multiple point-in-time copies of the source database. The storage system receives a request to create a virtual application environment that matches a state of the source application environment corresponding to a target point-in-time. The storage system identifies a point-in-time copy of the source application obtained before the target point-in-time and creates a virtual application comprising a set of files linked to data blocks associated with the identified point-in-time copy. The storage system also identifies a point-in-time copy of the source database obtained before the target point-in-time and creates a virtual database comprising a set of files linked to data blocks associated with the identified point-in-time copy. The storage system mounts the sets of files on one or more target servers. The storage system modifies the configuration of the virtual application to access the virtual database. The virtual application configured to access the virtual database is provided as the virtual application environment.

The features and advantages described in this summary and the following detailed description are not all-inclusive. Many additional features and advantages will be apparent to one of ordinary skill in the art in view of the drawings, specification, and claims hereof.

Figure 1:
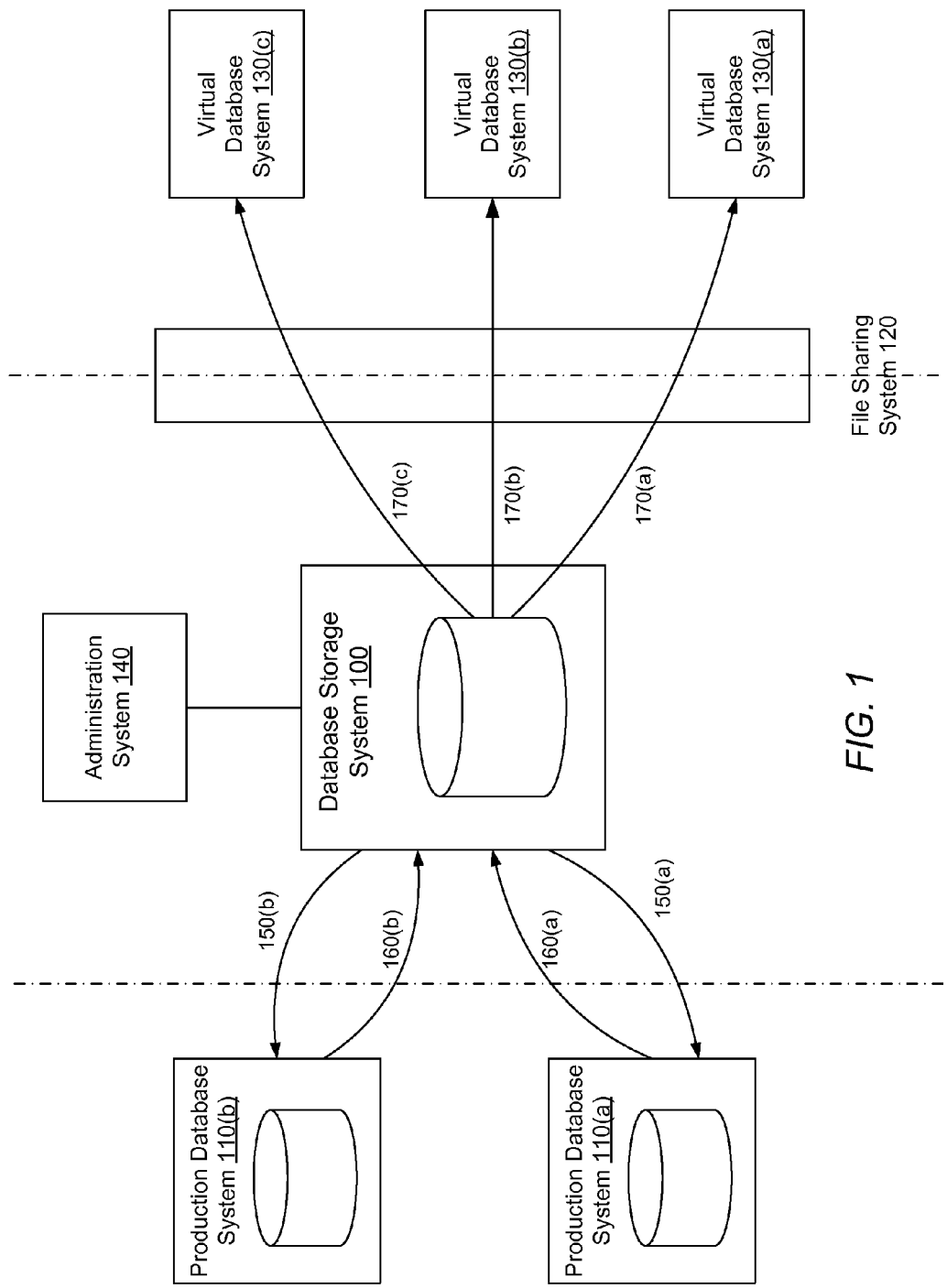
FIG. 1 is diagram illustrating how information is copied from a production database to a database storage system and provisioned as virtual databases using a file sharing system, in accordance with some embodiments.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Virtual database systems provide a storage and performance efficient solution to performing functions such as replicating, storing historical changes to, rewinding, and refreshing virtual databases. Users of virtual databases frequently develop and use application data and application files to interface with these virtual databases. However, provisioning solutions such as those described above for efficiently replicating structured databases do not conventionally extend to applications that interface with the structured databases. As a result, there is a need for analogous functionality to provision applications so as to efficiently replicate, store historical changes to, and rewind back in time, the application along with the structured databases.

Accordingly, embodiments provide storage efficient provisioning capability and functionality analogous to VDBs for application specific data. This allows users, for example, developers to access virtual copies of the application specific data in a storage and performance efficient manner. Furthermore, this capability of efficiently provisioning application data allows users to access saved historical changes to the application specific data over time thereby allowing users to efficiently rewind the application specific data synchronously with the virtual database.

Virtual Database Systems

In certain embodiments of the invention, one or more virtual databases are created based on the state of a production database or a virtual database at a particular point in time. The virtual databases can then be individually accessed and modified as desired. A database comprises data stored in a computer for use by computer implemented applications. A database server is a computer program that can interact with the database and provides database services, for example, access to the data stored in the database. Embodiments create a virtual database using storage level snapshots of production databases or clones of production databases instead of a live production database. Virtual database systems are described in U.S. patent application Ser. No. 12/603,541 filed on Oct. 21, 2009, now issued as U.S. Pat. No. 8,150,808, which is incorporated by reference herein in its entirety.

In one embodiment, information from the production database is copied to a storage system at various times, such as periodically. This enables reconstruction of the database files associated with the production database for these different points in time. The information may be managed in the storage system in an efficient manner so that copies of information are made only if necessary. For example, if a portion of the database is unchanged from a version that was previously copied, that unchanged portion need not be copied. A virtual database created for a point in time is stored as a set of files that contain the information of the database as available at that point in time. Each file includes a set of data blocks and the data structures for referring to the data blocks.

A virtual database may be created on a database server by creating the database files for the production database corresponding to the state of the production database at a previous point in time, as required for the database server. The files corresponding to the virtual database are made available to the database server using a file sharing mechanism, which links the virtual database to the appropriate data blocks stored on the storage system. The process of making the virtual database available to a database server is called "provisioning" the virtual database. Multiple VDBs can be provisioned based on the state of the production database at the same point in time. On the other hand, different VDBs can be based on different point in time state of the same production database or different production databases. VDBs may also be based on other VDBs.

The database server on which a virtual database has been provisioned can read from and write to the files stored on the storage system. A database block may be shared between different files, each file associated with a different VDB. In particular, a database block is shared if the corresponding virtual database systems 130 are only reading the information in the database block and not writing to the database block. In one embodiment, the virtual database manager 375 makes copies of the database blocks only if necessary. For example, a particular database block may be shared by multiple VDBs that read from the same database block. But if one of virtual database systems 130 attempts to write to the database block, a separate copy of the database block is made because the writing operation causes that database block to be different for the VDB corresponding to that virtual database systems 130 than it is for the other VDBs.

FIG. 1 illustrates one embodiment for how information may be copied from a production database to a database storage system and provisioned as virtual databases using a file sharing system. The database storage system 100 retrieves data associated with databases from one or more production database systems 110 and stores the data in an efficient manner, further described below. A database administrator user interface 140 allows a database administrator to perform various actions supported by the database storage system 100.

In response to a request from the administrator system 140, or based on a predefined schedule, the database storage system 100 may send a request 150 for data to a production database system 110. The production database system 110 responds by sending information stored in the production database as a stream of data 160. The database storage system 100 receives the data 160 sent by the production database system 110 and stores the data. The database storage system 100 stores the information efficiently, for example, by keeping versions of database blocks that have changed and reusing database blocks that have not changed.

To create a virtual database, the database storage system 100 creates files that represent the information corresponding to the production database system 110 at a given point in time. The database storage system 100 exposes 170 the corresponding files to a virtual database system 130 using a file sharing system 120. The virtual database system 130 runs a database server that can operate with the files exposed 170 by the database storage system 100. Hence, a virtual copy of the production database is created for the virtual database system 130 for a given point in time in a storage efficient manner.

Figure 2:
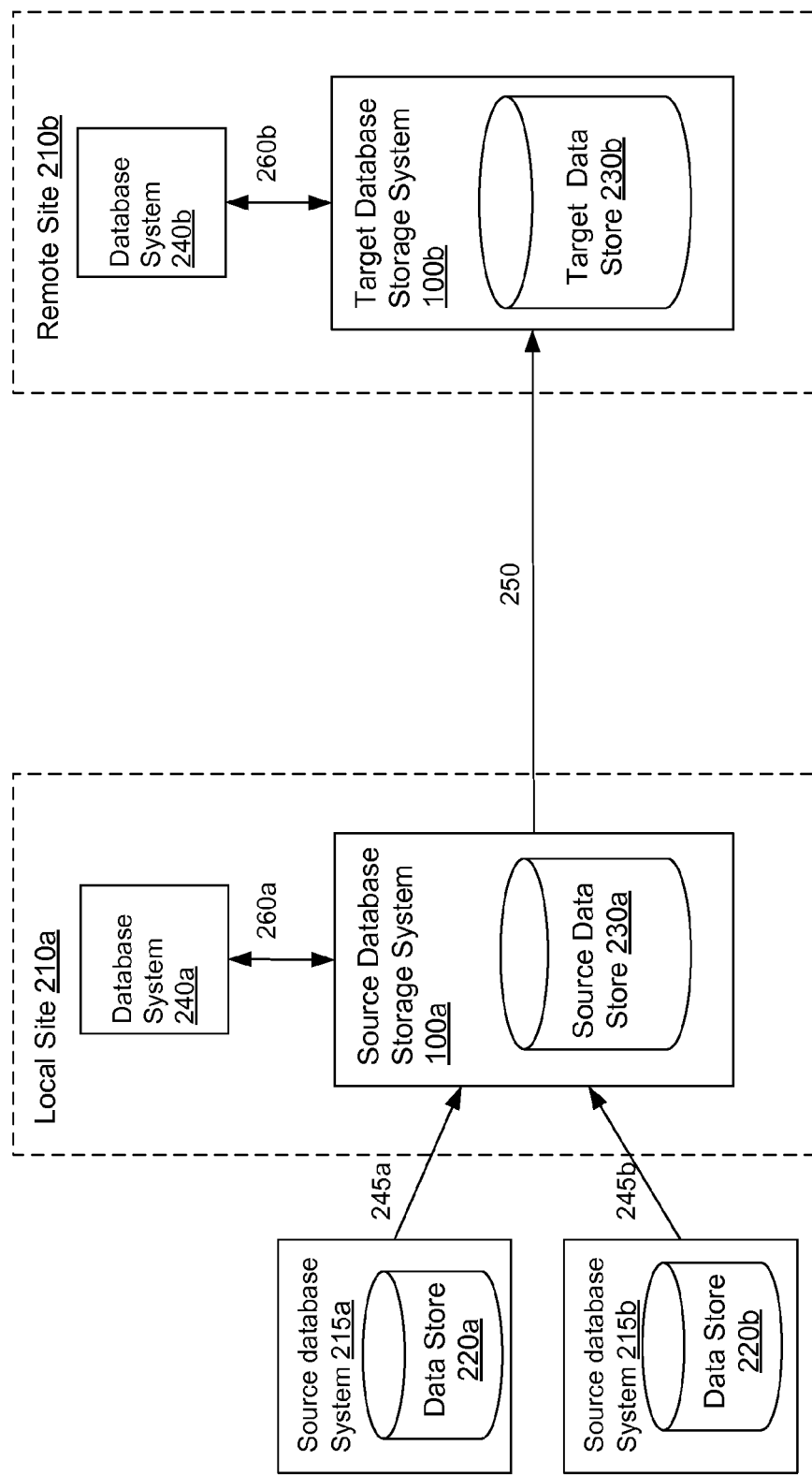
FIG. 2 illustrates an example workflow scenario showing remote provisioning of virtual databases according to an embodiment.

VDBs can be used in various workflow scenarios. FIG. 2 illustrates an example workflow scenario showing remote provisioning of virtual databases according to an embodiment. There are two sites that store database storage systems. The local site 210a comprises the source database storage system 230a and the remote site 210b comprises the target database storage system 230b. There may be one or more source database systems 215 that include data stores 220. The source database system 215a includes data store 220a and the source database system 215b includes the data store 220b. The changes to the data stores 220 of the source database systems 215 are periodically received 245 by the source storage database system 100a and stored in the source data store 230a. A database system 240a may create virtual databases in the source database storage system 100a and read/write 260a to the VDB.

Information describing changes to data in the source database storage system 100a is transmitted 250 to the target storage database system 100b. These comprise the changed data blocks since the last time the data was transmitted from the source database storage system 100a is transmitted 250 to the target storage database system 100b. The changes to the data in the source database storage system 100a may be transmitted 250 periodically or based on a predetermined schedule. A database system 240b creates virtual databases in the target database storage system 100b. The database system 240b is allowed to read/write 260b to the VDB.

System Architecture

Figure 3:
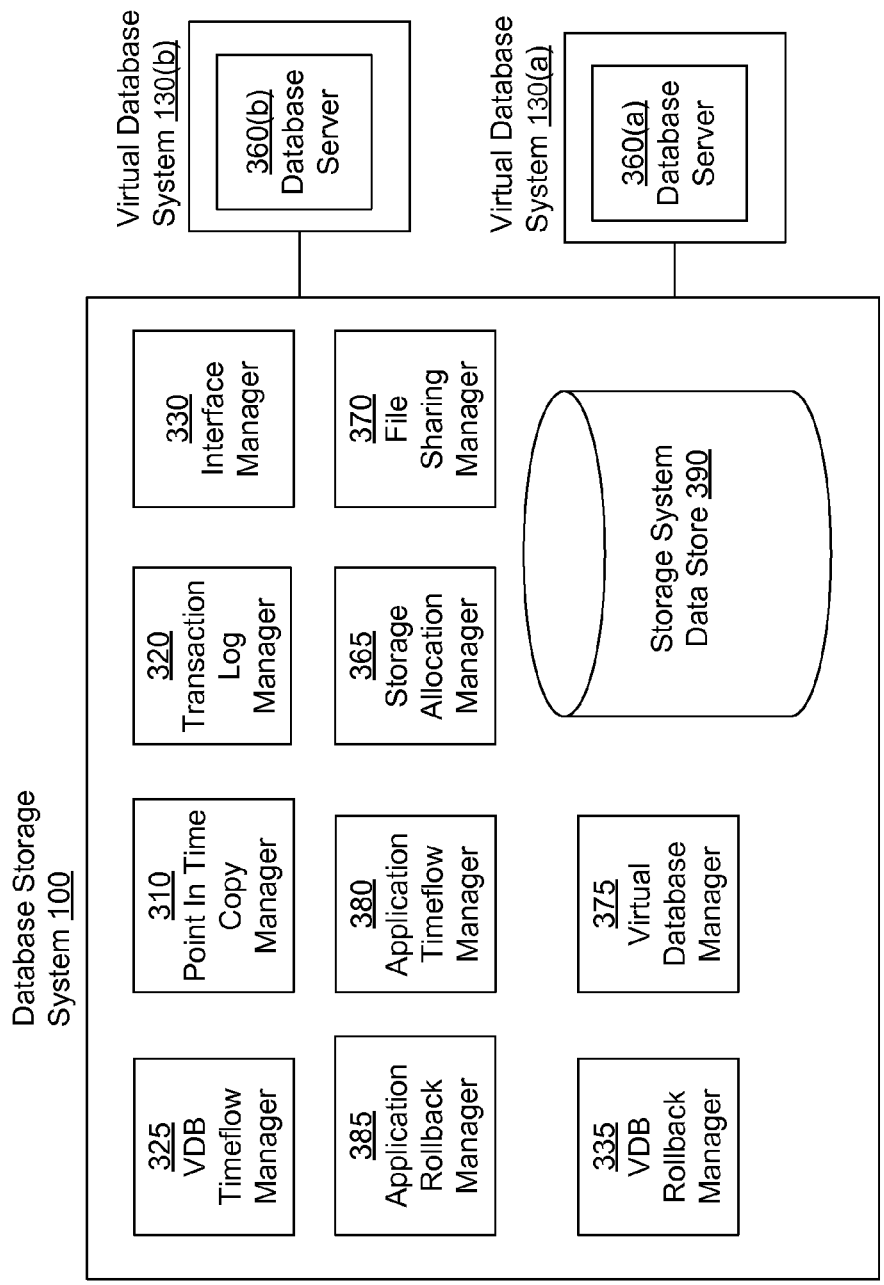
FIG. 3 is a diagram of the architecture of a system that makes storage efficient copies of information from a production database and provisions virtual databases, in accordance with some embodiments.

FIG. 3 shows a high level block diagram illustrating a system environment suitable for making storage efficient copies of information from a production database and provisioning one or more virtual databases using that information. The system environment comprises a database storage system 100, and one or more virtual database systems 130. Systems shown in FIG. 3 can communicate with each other if necessary via a network. FIG. 3 does not illustrate other systems that may be used for example, a production database system 110 or an administration system 140.

The database storage system 100 retrieves information available in the production database systems 110 and stores it. The information retrieved includes database blocks comprising data stored in the database, transaction log information, metadata information related to the database, information related to users of the database and the like. The information retrieved may also include configuration files associated with the databases. For example, databases may use vendor specific configuration files to specify various configuration parameters including initialization parameters associated with the databases. The database storage system 100 also retrieves and stores application data from the production database system 110.

The data stored in the storage system data store 390 can be exposed to a virtual database system 130 allowing the virtual database system 130 to treat the data as a copy of the production database stored in the production database system 110. The database storage system 100 includes a point-in-time copy manager 310, a transaction log manager 320, a VDB timeflow manager 325, an interface manager 330, a VDB rollback manager 335, a storage allocation manager 365, a file sharing manager 370, a virtual database manager 375, an application snapshot manager 380, an application rollback manager 385, a storage system data store 390, and an application timeflow manager 395. In alternative configurations, different and/or additional modules can be included in the database storage system 100.

The point-in-time copy manager 310 interacts with the production database system 110 by sending a request to the vendor interface module 335 to retrieve information representing a point-in-time copy (also referred to as a "PIT copy") of a database stored in the production DB data store 350. The point-in-time copy manager 310 stores the data obtained from the production database system 110 in the storage system data store 390. The data retrieved by the point-in-time copy manager 310 corresponds to database blocks (or pages) of the database being copied from the production DB data store 350. After a first PIT copy request to retrieve information production DB data store 350, a subsequent PIT copy request may need to retrieve only the data that changed in the database since the previous request.

The transaction log manager 320 sends request to the production database system 110 for retrieving portions of the transaction logs stored in the production database system 110. In some embodiments, the request from the transaction log manager 320 is sent to the vendor interface module 335. The data obtained by the transaction log manager 320 from the vendor interface module 335 is stored in the storage system data store 390. In one embodiment, a request for transaction logs retrieves only the changes in the transaction logs in the production database system 110 since a previous request for the transaction logs was processed. The database blocks retrieved by a point in time copy manager 310 combined with the transaction logs retrieved by the transaction log manager 320 can be used to reconstruct a copy of a database in the production system 110 corresponding to times in the past in between the times as which point-in-time copies are made.

The storage allocation manager 365 provides the functionality of saving data retrieved from the production database system 110. For example, the point-in-time copy manager 310 may call APIs of storage allocation manager to save blocks of data retrieved from the production database system 110. The storage allocation manager 365 keeps track of the various versions of each block of data that may be obtained from the production database system 110. For a given time point, the storage allocation manager 365 can be requested to provide the latest version of a block of data obtained before the given time point. The storage allocation manager 365 can also be used for making copies of blocks of data. Inn an embodiment, if a block of data is copied for read-only purposes, the storage allocation manager 365 allocates only sufficient storage to keep a pointer of reference to the exiting block of data. However, if an attempt to write to the copied block of data is made, the storage allocation manager 365 allocates sufficient storage to make an actual copy of the block of data to avoid updating the original block of data.

The file sharing manager 370 allows files stored in the storage system data store 390 to be shared across computers that may be connected with the database storage system 100 over the network. The file sharing manager 370 uses the file sharing system 120 for sharing files. An example of a system for sharing files is a network file system (NFS). Sharing a file stored in the storage system data store 390 using the file sharing manager 370 allows a remote computer, for example, the virtual database systems 130 to access the data in the shared file. A remote system may be able to read and write from/to the file shared by the storage system data store 390.

The virtual database manager 375 receives requests for creation of a virtual database for a virtual database system 130. The request for creation of a virtual database may be sent by a database administrator using the administration system 140 and identifies a production database system 110, a virtual database system 130, and includes a past point-in-time corresponding to which a virtual database needs to be created. The virtual database manager 375 creates the necessary files corresponding to the virtual database being created and shares the files with the virtual database system 130. The database administrator for a virtual database system 130 may be different from a database administrator for the production database system 110.

A VDB timeflow manager 325 maintains the storage, update, and retrieval of information associated with one or more timeflows corresponding to the virtual database. Such timeflow information includes information associated with a continuous series of changes made to the VDB across time; including one or more time points along a VDB timeflow, sequence change numbers and transaction logs associated with updates or modifications to the VDB files along the timeflow, snapshots of the files at a subset of the time points along the timeflow, and the like.

A VDB rollback manager 335 receives user requests to rewind or rollback a VDB to a user-specified point along a timeflow. The VDB rollback manager 335 interfaces with the VDB timeflow manager 325 to access timeflow information corresponding to the virtual database so as to retrieve a representation of the virtual database at the user-specified point in time and to create of a new timeflow originating at the user-specified point.

An application timeflow manager 380 maintains storage, update, and retrieval of information associated with one or more timeflows corresponding to the virtual application. Such information may include one or more time points along the one or more application timeflows, a continuous series of updates or modifications to the application files along the timeflow, snapshots of the application files at a subset of the time points along the one or more application timeflow, and the like.

An application rollback manager 385 receives user requests to rewind or rollback application specific data to a user-specified point along an application timeflow. The application rollback manager 385 interfaces with the application timeflow manager 380 to access timeflow information corresponding to the virtual application so as to retrieve a representation of the virtual application at the user-specified point in time and to create a new timeflow originating at the user-specified point.

A virtual database system 130 includes a database server 360. The database server 360 is similar in functionality to the database server 345 and is a computer program that provides database services and application programming interfaces (APIs) for managing data stored on a data store 350. The data managed by the database server 360 may be stored on the storage system data store 390 that is shared by the database storage system 100 using a file sharing system 120. In alternative configurations, different and/or additional modules can be included in a virtual database system 130.

Figure 4:
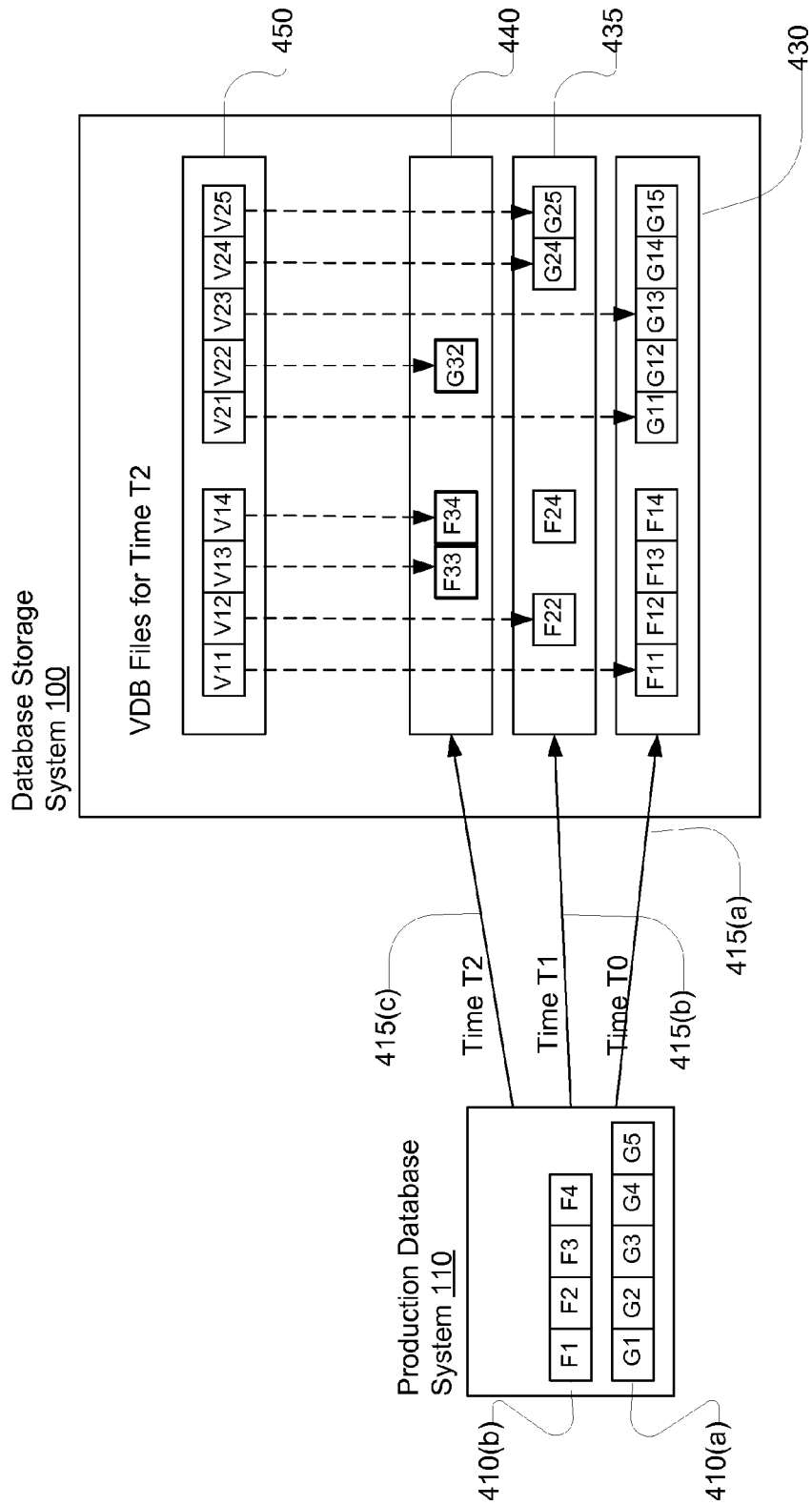
FIG. 4 illustrates a structure of data stored in a virtual database according to some embodiments.

FIG. 4 indicates how storage efficient copies are made to create a read/write file structure representing a VDB. As shown in FIG. 4, the structures 410 represent the files corresponding to a database on the production database system 110. The structures Fi and Gi represent database blocks stored in the files 410 respectively (Fi refers to F1, F2, F3, . . . and similarly Gi refers to G1, G2, G3, . . . ). The arrows 415 represent the process of making PIT copies at different time points Ti. The first PIT copy 430 made at time T0 needs to copy all the necessary database blocks of the database. For example, Fli represents a copy of block Fi and block Gli represents a copy of block Gi. The PIT copy 435 made at time T1 copies only the blocks that changed since the last PIT copy and may copy much less data compared to the first PIT copy. Similarly at time T2 another PIT copy 440 is made copying the database blocks that changed since the previous PIT copy 435.

Assuming the PIT copy 440 is the last PIT copy made for the configuration shown in FIG. 4, the VDB file structures 450 are created for time point T2. When the structure 450 are created, the blocks V11, V12, . . . , V25 may be implemented as pointers to the actual database block that stores the data. For example, V11 represents the information in block F1 and since the block F1 was never updated during copies made at time Ti and T2, V11 points at F11. V12 represents the information in block F2 and since F2 was updated at time T1, V12 points at the block F22. Similarly, V13 corresponds to block F3 that was updated at time T2 and points at the block F33.

Figure 5A:
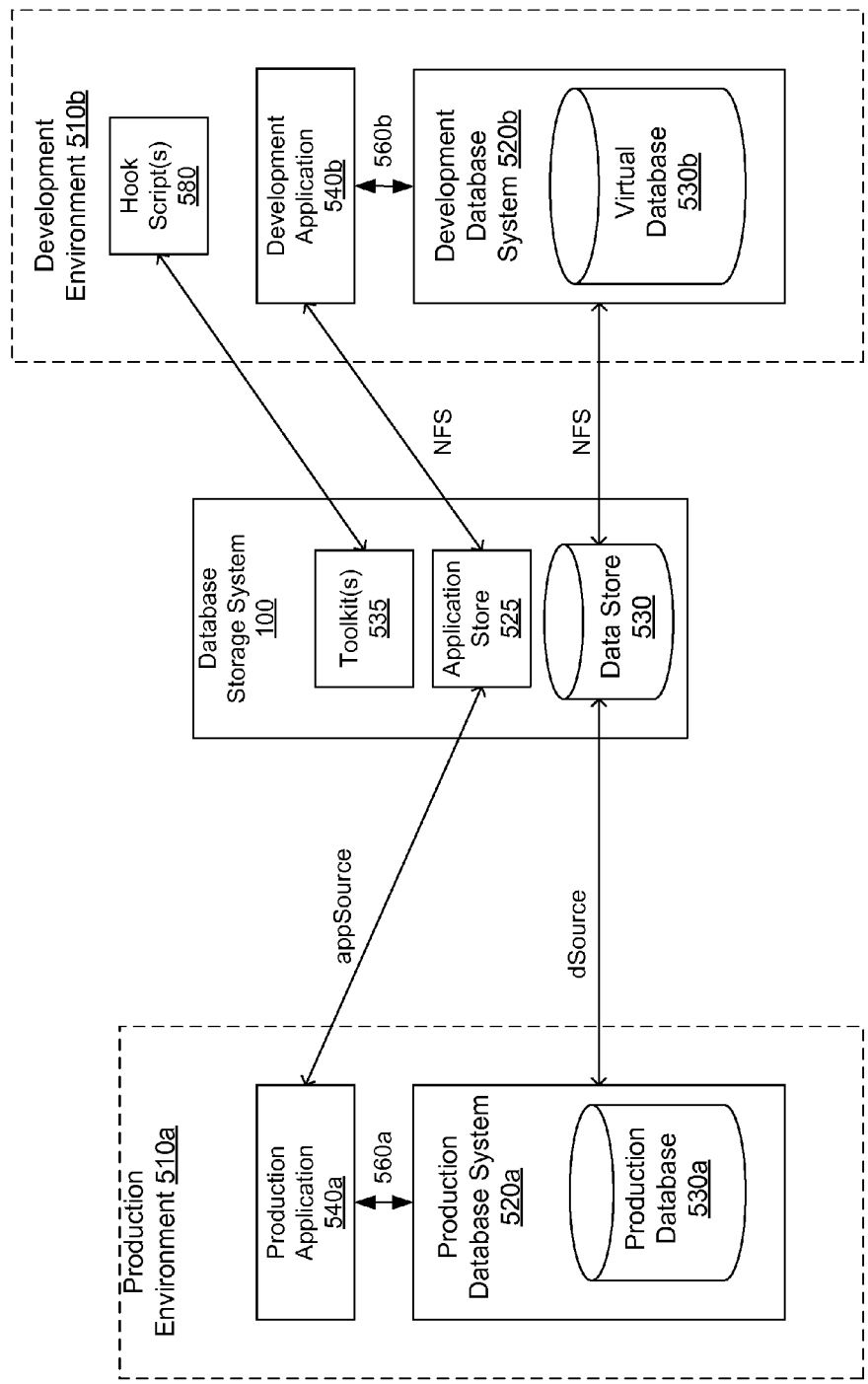
FIG. 5a illustrates the architecture of a system that makes storage efficient copies of information from a production database and ac production application associated with the production database and provisions a virtual database and a virtual application to a target environment, according to some embodiments.

FIG. 5a illustrates the architecture of a system that makes storage efficient copies of information from a production database and a production application associated with the production database and provisions a virtual database and a virtual application to a target environment, according to some embodiments.

As shown in FIG. 5a, a production environment 510a includes a database storage system 100 corresponding to production database system 520a (including a production database 530a) and a production application 540a that interfaces (560a) with the production database system 520a to retrieve and store data. The production database system 520a stores data blocks corresponding to multiple point-in-time copies of a source database (e.g., production database 530a). The production application 540a includes application specific data, executable files, configuration files and the like. The application specific data is stored outside the production database, for example, documents, images, audio files, video files and other data processed by the application.

The data from production database system 520a is provisioned to one or more target database storage systems (e.g., target database storage systems such as development database system 520b) at one or more corresponding development environments (e.g., development environment 510b). In some embodiments, as shown in FIG. 5a, virtual databases (e.g., VDB 530b) are provisioned using the target or development database storage system (e.g., development database system 520b) for use by developers and clients to access or read the data as well as to make modifications and updates to the data at the respective development environments. Furthermore, changes made to the source database storage system (e.g., production database system 520a) are propagated to the development database storage system (e.g., development database system 520b).

To enable provisioning of the data from production database system 520a to the development database system 520b, the database storage system 100 retrieves data associated with production database 530a and stores the data in data store 530 in a storage-efficient and performance-efficient manner, for example, by keeping versions of database blocks that have changed between consecutive data retrieval operations and reusing database blocks that have not. Database storage system 100 creates files that represent the information corresponding to the production database system 110 at a given point in time (e.g., as explained further with reference to FIG. 4 and FIG. 6a below). Database storage system 100 then exposes the corresponding files to the virtual database system (e.g., VDB 530b) using a file sharing system (e.g., Network File Sharing System, NFS) as illustrated in FIG. 5a.

Along similar lines, upon receiving user parameters (e.g., a source path, port number, user name, password, and the like) for retrieval of application specific data, the database storage system 100 retrieves application data associated with production application 540a and stores the application specific data in application store 525. Database storage system 100 creates application files or application specific data that represent the information corresponding to the production application 540a at a given point in time (e.g., as explained further with reference to FIG. 6b below). Database storage system 100 then exposes the corresponding application specific data to development application 540b also using a file sharing system (e.g., Network File Sharing System, NFS) as illustrated in FIG. 5a. In an embodiment, the development application 540b may execute on an application server that is separate from the development database system 520b. Accordingly, the virtual database is provisioned to a target database server and the virtual application is provisioned to a target application server. In another embodiment, the virtual database and the virtual application are treated as a virtual application environment that is treated as a single entity that is provisioned to one or more target servers. Each virtual application environment comprises at least a virtual application and a virtual database such that the virtual application is configured to access the virtual database. The virtual application may receive requests for processing. The virtual application stores data in the virtual database and reads/writes to the virtual database for processing requests received by the virtual application.

The database storage system 100 receives different point-in-time copies of a source application environment comprising a source application configured to access a source database. The database storage system 100 receives different point in time copies of the source application. The database storage system 100 also receives different point in time copies of the source database. In some embodiments, database storage system 100 captures snapshots of source database blocks (e.g., located at production database 530a) by synchronizing with the production database (e.g., also referred to as dSource) located on the source database system. Analogously, in some embodiments, database storage system 100 captures snapshots of application data (e.g., production application 540a) by synchronizing with application binaries (e.g., also referred to as appSource) located on the source system. In an embodiment, the synchronization with a source of data (source database or application data) comprises receiving an initial copy of the data and subsequently receiving changed blocks of data from the source of data at different points in time, for example, periodically. The changed blocks of data are stored in the database storage system 100 in a storage efficient manner, such that a snapshot of the complete source of data can be reconstructed by using data blocks from different points in time, for example, by pointing at data blocks obtained at various points in time. Accordingly, the database storage system 100 stores data blocks for a plurality of different point-in-time copies of the source application, wherein at least some of the stored database blocks are associated with multiple point-in-time copies of the source application. Similarly, the database storage system 100 stores data blocks for a plurality of different point-in-time copies of the source database, wherein at least some of the stored data blocks are associated with multiple point-in-time copies of the source database.

Database storage system 100 includes toolkit(s) 535 to provide a set of scripts or executables which are run by the database storage system 100 on the development environment or target environment) at certain 'hook' points during the manipulation of virtualized data (e.g. to perform an initial load an empty NFS or iSCSI share is exported to a host server and then a customer's script or executable code is run on the host server which would enable copying of the relevant data into the share). Additionally, database storage system 100 receives and persists application specific data from hook script(s) 580 and passes the application specific data along to other hook scripts if relevant. Toolkits define the user input required by operations like initial load and provision (e.g., to locate the source data for an initial load).

Figure 5B:
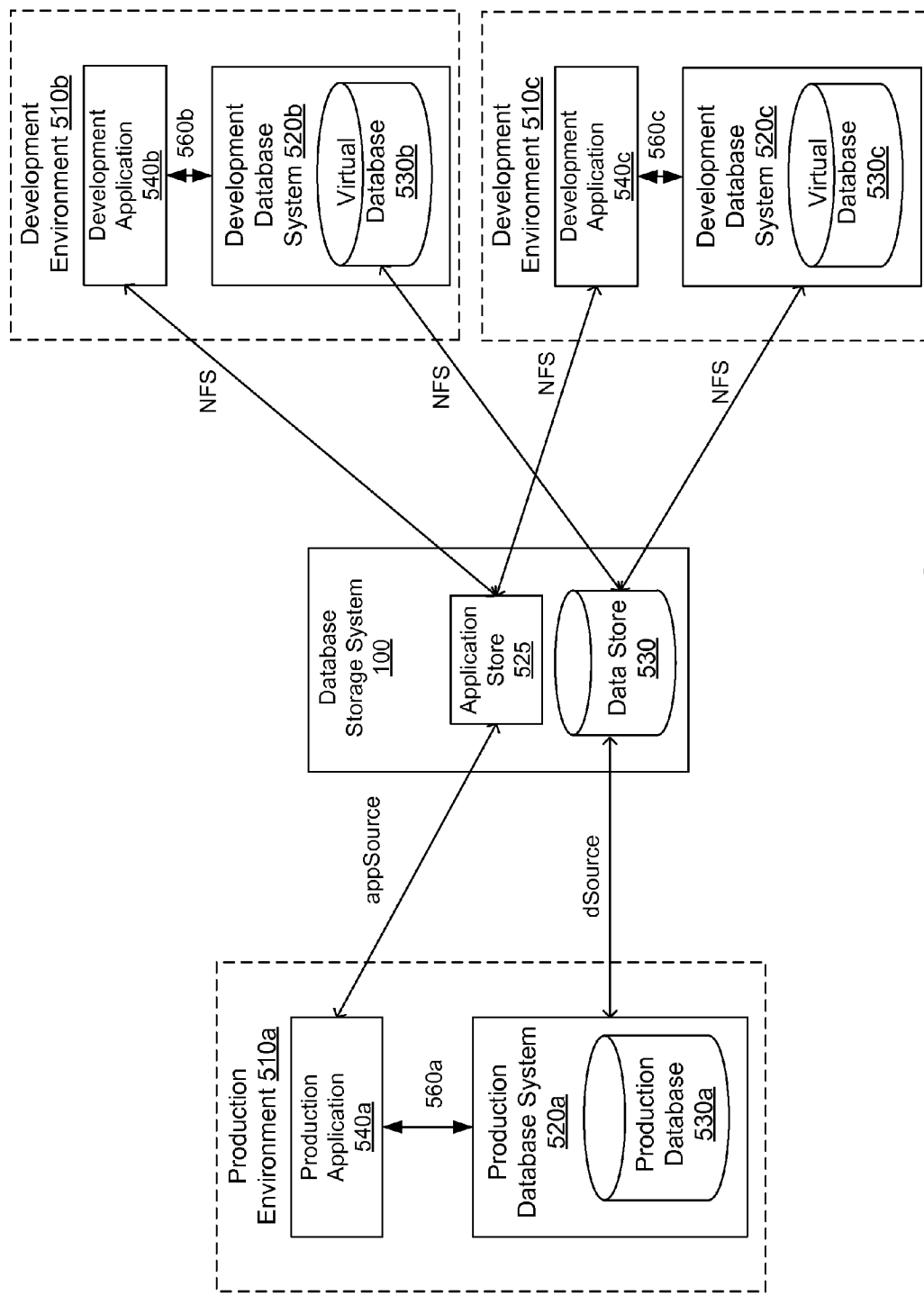
FIG. 5b illustrates the architecture of a system that makes storage efficient copies of information from a production database and a production application and provisions different copies of virtual databases and virtual applications to different target environments, according to some embodiments.

FIG. 5b illustrates the architecture of a system that makes storage efficient copies of information from a production database and production application and provisions different copies of virtual databases and virtual applications to multiple development environments, according to some embodiments.

As shown in FIG. 5b, in some embodiments, the data from production database system 520a is concurrently replicated across multiple remote database storage systems (e.g., multiple target database storage systems such as development database system 520b, development database system 520c and the like) at multiple corresponding development environments (e.g., development environment 510b, development environment 510c and the like).

As such, multiple virtual databases (e.g., Virtual Database 530b, Virtual Database 530c and the like) and multiple development applications (e.g., development application 540b, development application 540c and the like) are concurrently provisioned using the target or development database storage system (e.g., development database system 520b, development database system 520c and the like) for concurrent use by developers and clients at different development environments to access or read the data as well as to make modifications and updates to the data at the respective development environments.

Figure 5C:
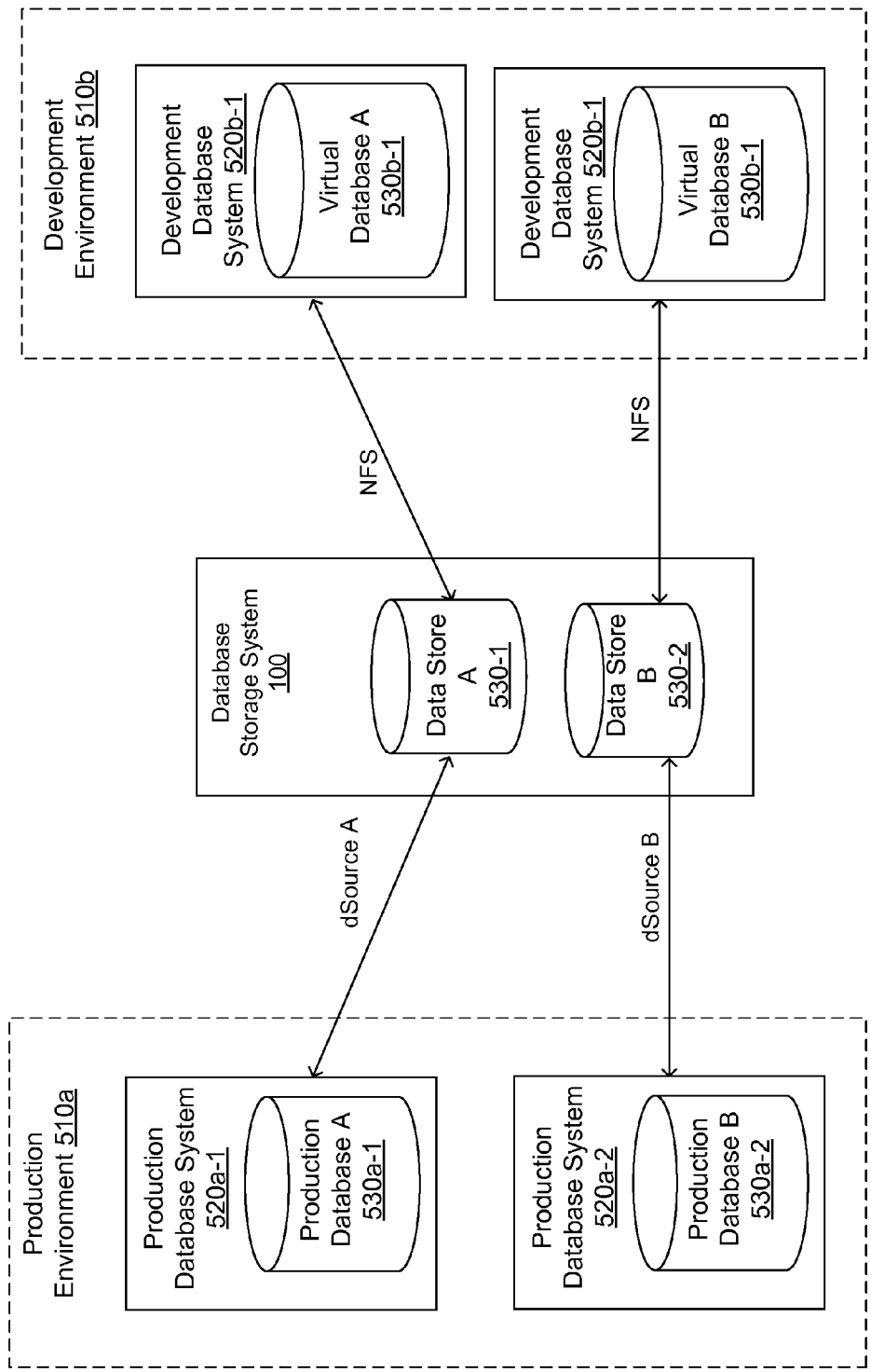
FIG. 5c illustrates the architecture of a system that makes storage efficient copies of information from different production database systems (e.g., database systems that store different types of source databases with different and arbitrary data types) and provisions virtual databases to a target environment, according to some embodiments.

FIG. 5c illustrates the architecture of a system that makes storage efficient copies of information from different production database systems (e.g., database systems that store different types of source databases with different and arbitrary data types) and provisions virtual databases to a development environment, according to some embodiments.

Accordingly, a first production database system (e.g., production database system 520a-1) stores data blocks corresponding to multiple point-in-time copies of a first source database (e.g., production database A 530a-1) storing a first type of data, and a second production database system (e.g., production database system 520a-1) stores data blocks corresponding to multiple point-in-time copies of a first source database (e.g., production database A 530a-1) storing a second type of data. In some embodiments, the first type of data is structured data (e.g., data that is organized based on a fixed schema or predefined structure) and the second type of data is unstructured data (e.g., data comprising files or data records that are not organized based on a fixed structure or schema). FIG. 5c illustrates a system that makes storage efficient copies of information from the first and the second production database systems for replication and provisioning of the first and second type of data across the same or different development environments as described above with reference to FIG. 5a.

Creating Snapshots of a Virtual Database

Figure 6A:
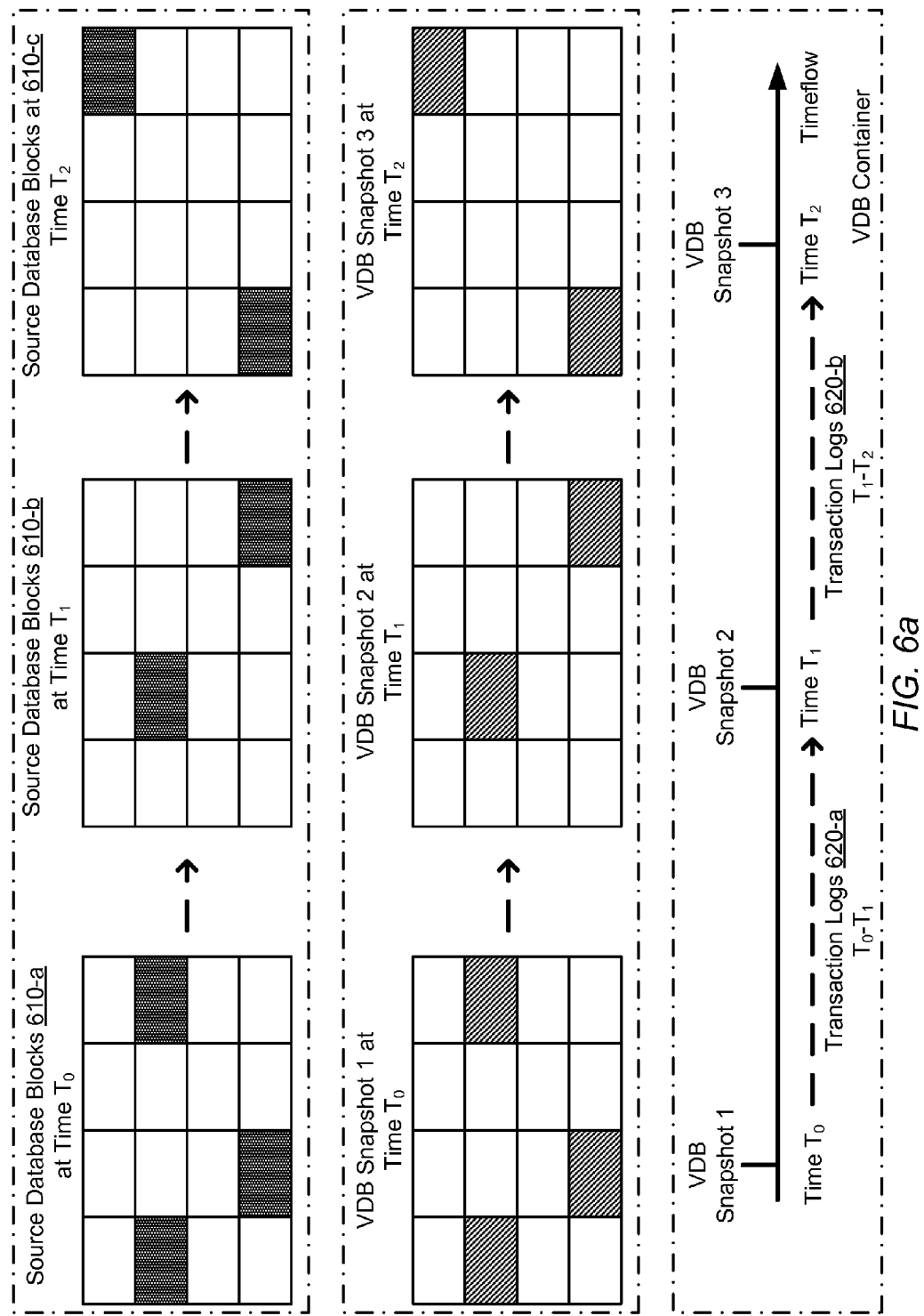
FIG. 6a illustrates a process of capturing snapshots of a virtual database, at various time points along a timeflow, corresponding to changes in a source database, according to some embodiments.

FIG. 6a illustrates a process of capturing snapshots (alternatively referred to herein as point-in-time copies) of a virtual database (at various time points along a time line or a timeflow), corresponding to changes in the source database, according to some embodiments.

Shown in FIG. 6a is a time progression along a time line (alternatively referred to herein as a timeflow) of changes in a source database (e.g., production database 110, as explained with reference to FIG. 4; or production database 530a shown in FIG. 5a) and corresponding changes in the VDB snapshots captured at one or more time points along the timeflow. As explained above with reference to FIG. 4, changes or updates in specific blocks of the source database result in changes in the corresponding VDB files that point to those specific blocks of the source database. Conversely, VDB files that correspond to or point to blocks of the source database that are not updated or modified are themselves not modified or updated.

Accordingly, as shown in the timeflow in FIG. 6a, a VDB snapshot (e.g., VDB snapshot 1) is captured at time $T_0$. At time $T_0$ or immediately prior to time $T_0$ (e.g., subsequent to the capture of a snapshot immediately prior to snapshot 1), the highlighted source database blocks (e.g., in the illustration of source database blocks 610-a) are updated or modified. Consequently, VDB files corresponding to the modified source database blocks are updated or modified (as shown in FIG. 6a); VDB Snapshot 1 captured at time $T_0$ therefore reflects the VDB file changes corresponding to source database changes that occurred after capture of a snapshot immediately prior to VDB Snapshot 1.

Subsequently, as shown in the timeflow in FIG. 6a, VDB Snapshot 2 is captured at time $T_1$. source database blocks that are updated or modified between time $T_0$ and time $T_1$ are as highlighted (e.g., in the illustration of source database blocks 610-b); VDB files corresponding to the modified source database blocks are correspondingly updated or modified, and reflected in VDB Snapshot 2 captured at time $T_1$.

The modifications to the VDB that occur between time $T_0$ and time $T_1$ are reflected in the transaction logs 620-a between time $T_0$ and time $T_1$. As explained above with reference to FIG. 3, the transaction logs can be used to reconstruct a copy of the source database corresponding to time points between the times at which snapshots are captured (e.g., in this example, between time $T_0$ and time $T_1$).

Furthermore, along the timeflow shown in FIG. 6a, VDB snapshot 2 is captured at time $T_1$. Source database blocks that are updated or modified between time $T_1$ and time $T_2$ are as highlighted (e.g., in the illustration of source database blocks 610-c); VDB files corresponding to the modified source database blocks are updated or modified, and reflected in VDB snapshot 3 captured at time $T_2$. The modifications to the VDB that occur between time $T_1$ and time $T_2$ are reflected in the transaction logs 620-b between time $T_0$ and time $T_1$, which can be used to reconstruct a copy of the source database corresponding to time points between time $T_1$ and time $T_2$.

As a result, historical changes, updates or modifications to source database blocks (e.g., database blocks in a production database) can be monitored and saved across time in a storage and performance efficient manner, and these changes replicated across remote target (e.g., development) environments.

Figure 6B:
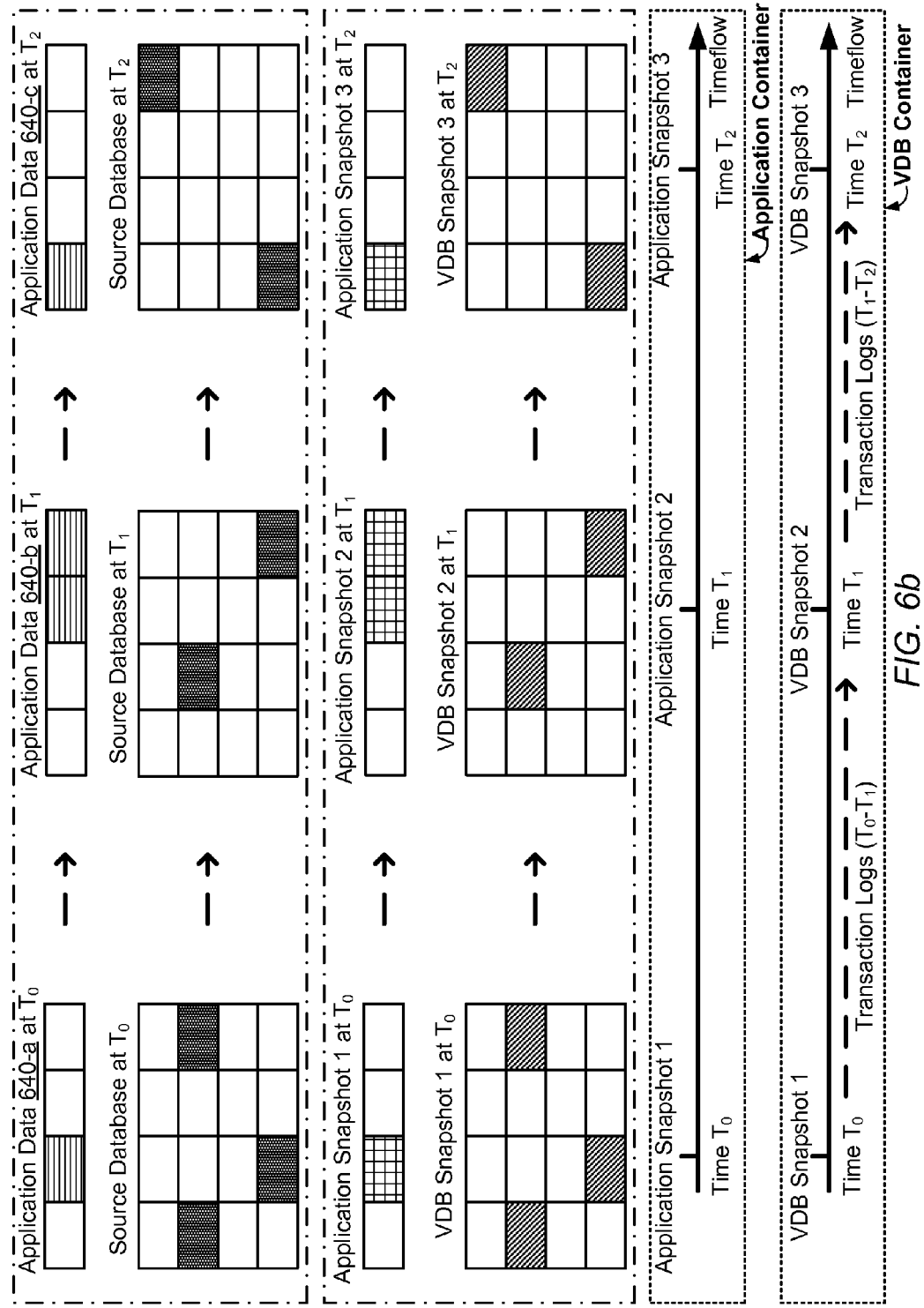
FIG. 6b illustrates a process of capturing snapshots of a virtual database and a virtual application, across various time points along a timeflow, corresponding to changes in a source database (e.g., a production database) and a source application (e.g., a production application), according to some embodiments.

Further, FIG. 6b illustrates a process of capturing snapshots of a virtual database and a virtual application (at various points in time along a timeflow), corresponding to changes in a source database (e.g., a production database) and a source application (e.g., a production application), according to some embodiments.

Embodiments (e.g., as described in FIG. 4 and FIG. 6a) store point-in-time copies or snapshots of virtual databases, associated with source or production databases, and provide database users the flexibility to provision, replicate, refresh, rewind, and fast-forward the virtual databases in a storage- and performance-efficient manner.

However, as described with reference to FIG. 5a, most database systems (e.g., production database systems) include applications (e.g., including executable files, configuration files, and other application specific data) that interface with the databases (e.g., the production databases). Database users and developers at one or more development environments frequently access application data from the production environment, create a local copy of the application data at the development environments, and modify or update the application data to conform to their needs. Examples of application data include documents, images, video and audio data, binary data, and so on. After making a series of updates and changes to the application data, the developers at the one or more development environments check in the modified application data back into the production environment. Embodiments capture snapshots of the application data over time, in a storage and time efficient manner (e.g., analogous to the approach described above with reference to FIG. 4 and FIG. 6a for taking snapshots of production data).

Embodiments provide efficient mechanisms for capturing and saving storage and time-efficient snapshots of the source application and the source database so as to allow developers to provision, replicate, rewind, and refresh the virtual application data in a manner similar to the process described with reference to virtual databases above. In an embodiment, the database storage system stops the processes of virtual application and the virtual database before performing a rewind or refresh operation. After the rewind or refresh operation is performed on the virtual application and the virtual database, the database storage system restarts the processes of the virtual application and the virtual database. A rewind operation modifies the data block of the virtual application environment (including the data blocks of the virtual application and the virtual database) to point to data blocks associated with a different point-in-time, for example, a previous point in time. The refresh operation modifies the data block of the virtual application environment (including the data blocks of the virtual application and the virtual database) to point to data blocks associated with recent point-in-time, for example, the latest point-in-time copies of the virtual application and the virtual database.

Accordingly, the database storage system 100 retrieves source application specific data (e.g., from the production environment; production application 340a as shown in FIG. 5a) and block changes to the application specific data. For example, as shown in FIG. 6b, application data 640-a at time $T_0$, application data 640-b at time $T_1$, and application data 640-c at time $T_2$ correspond to source application specific data retrieved by the database storage system from the production environment; the highlighted blocks in the application specific data at each point in time along the application timeflow reflect changes to the application specific data relative to the immediately previous version of the application specific data.

Database storage system 100 saves and maintains, over multiple time points along the application timeflow, storage efficient application data snapshots (e.g., application snapshot 1 at time $T_0$, application snapshot 2 at time $T_1$, and application snapshot 3 at time $T_2$) associated with and indicative of changes and updates to the source application specific data.

As a result, historical changes, updates or modifications to source application data (e.g., application data in a production application) can be monitored and saved across time in a storage and performance efficient manner, and these changes replicated across remote target (e.g., development) environments.

Figure 7:
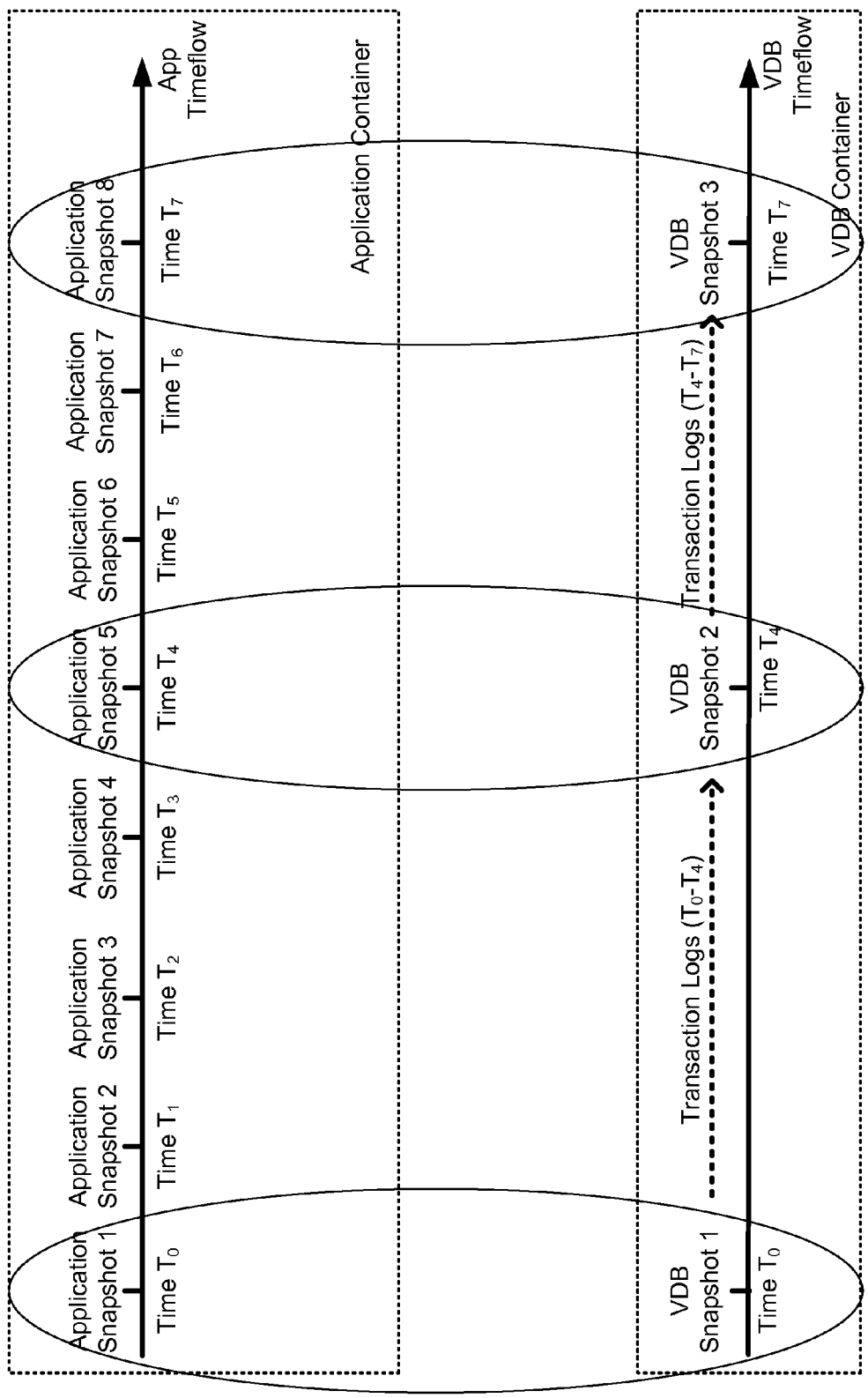
FIG. 7 illustrates a process of capturing snapshots of a virtual database and a virtual application at the development environment, according to some embodiments.

Further, FIG. 7 illustrates a process of capturing snapshots of a virtual database and a virtual application based on inputs received from hook scripts running on the production environment, according to some embodiments.

As shown in FIG. 7, a virtual database (e.g., VDB 1) undergoes modifications or updates based on updates to its source database (as explained with reference to FIG. 6*a*) at points in time along a timeflow (e.g., VDB Timeflow) associated with the virtual database. As described with reference to FIG. 6*a*, snapshots of the virtual database and changes to the virtual database files (corresponding to changes in the associated source database) are captured and stored at time points (e.g., $T_0$, $T_4$, and $T_7$) along the VDB timeflow. In some embodiments, snapshots associated with the virtual database (corresponding to changes in the source database) and information corresponding to the timeflow are stored in a virtual database container (e.g., VDB Container shown in FIG. 7).

In addition to the VDB snapshots and VDB Timeflow stored in the VDB Container, on the development environment, database storage system (e.g., application store 525 shown in FIG. 5*a*) captures and stores snapshots of the application data or application specific data (such as application snapshot 1, application snapshot 2, and the like) corresponding to changes in the associated source application at a subset of time points (e.g., $T_0$, $T_1$, $T_2$, $T_3$, and the like) along the application timeflow. In some embodiments, snapshots associated with the virtual application (e.g., corresponding to changes in the development application) and information corresponding to the timeflow are stored in an application container (e.g., application container shown in FIG. 7).

The snapshots of the application specific data may correspond to changes in the associated source application and/or the development application (such as modifications made to the development application 340*b*). The database storage system 100 synchronizes the copies of the application specific data at the application store 525 with changes being made to the application by users at the development environment (e.g., development environment 510*b* shown in FIG. 5*a*) using a time of initiation of a provisioning operation (e.g., by provisioning the application data from the closest available snapshot to a time at which a VDB was provisioned).

As shown in FIG. 7, database storage system saves transaction logs to track changes to the VDB between consecutive snapshots. However, in some embodiments, transaction logs are not stored to capture changes to the application specific data. As a result, snapshots of application specific data at the development environment are captured on the development end at a higher frequency (e.g., at average intervals of 30 seconds, 1 minute, 5 minutes, 1 hour, and the like) than a rate at which snapshots of the VDB are captured (e.g., as illustrated in FIG. 7). However, in other cases, the application snapshots may be captured at a lower frequency if the application data is changed at a lower frequency compared to the frequency at which data in the source database is updated. In general, the application snapshots and the database snapshots may be captured at different frequencies.

Respective snapshots of the VDB and the application specific data taken at the same point in time (e.g., at time $T_0$, $T_4$, or $T_7$) are optionally synchronized by the database storage system 100 (e.g., based on a time of provisioning, such as by provisioning the application data at a time that most closely matches the time at which the VDB was provisioned) so as to be able to replicate a copy of both the application and the VDB at the same point in time. This would permit the user to synchronously or concurrently rollback (or rewind) both the VDB and the application specific data to a common previous point in time (as described further with reference to FIGS. 8*a*-8*b* below).

It should be noted that, in some embodiments, the process or approach of synchronizing of application data snapshots and VDB snapshots taken on the production environment as opposed to the development environment is different.

In some embodiments, snapshots taken on the production environments are expensive and therefore infrequent. As a result, one or more forms of user input is used to perform the synchronization (e.g., to match the infrequent snapshots of the application data with VDBs (which can be provisioned from with greater frequency). For example, a customer employs an internal policy to only push application changes to production on Friday evenings, and then take a snapshot of the new application data. As a result, if the customer provisioned a VDB the following week they would know (based on their internal policy) to provision the corresponding application data from the application data snapshot taken the previous Friday.

On the other hand, application snapshots taken at the development environments may be taken at a low frequency. As a result, the application data that most closely matches the time the VDB is being provisioned from, is provisioned.

Rewind or Rollback of a Virtual Database

Figure 8A:
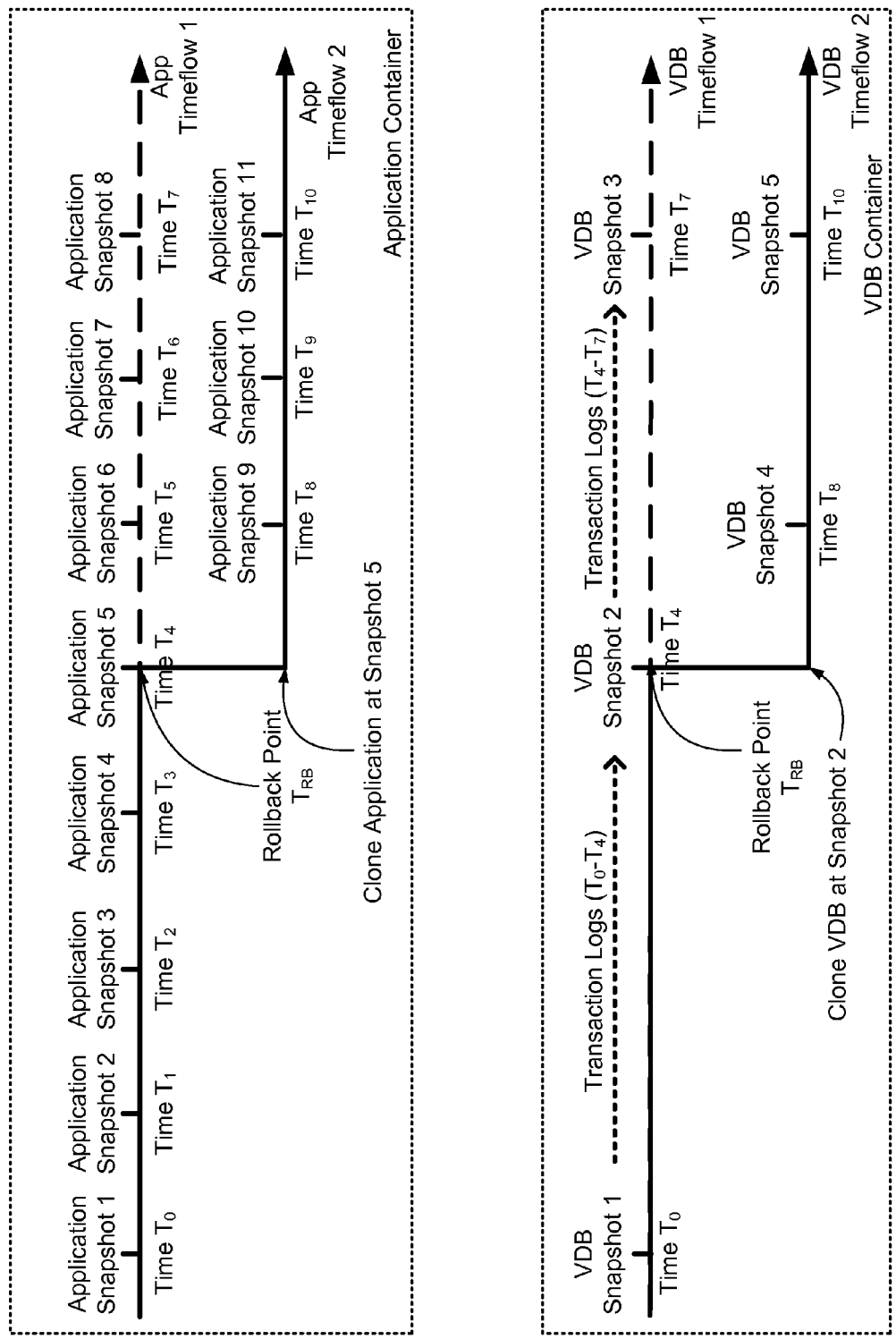
FIG. 8a illustrates an approach to rewinding a virtual database and a virtual application to a user-specified time point at which snapshots of both the virtual application and the virtual database exist, according to some embodiments.

FIG. 8*a* illustrates an approach to concurrently rewinding both a virtual database and a virtual application to a user-specified time point at which snapshots of both the virtual application and the virtual database exist, according to some embodiments.

In some embodiments, as shown in FIG. 8*a*, a virtual database undergoes modifications or updates based on updates to its source database at points in time along a timeflow associated with the virtual database (e.g., VDB timeflow 1). Snapshots of the virtual database and changes to the virtual database (corresponding to changes in the associated source database) are captured and stored at a subset of time points (e.g., $T_0$, $T_4$, and $T_7$) along VDB timeflow 1. In some embodiments, snapshots associated with the virtual database (corresponding to changes in the source database) and information corresponding to the VDB timeflow are stored in a virtual database container (e.g., VDB Container shown in FIG. 8*a*).

Similarly, application specific data undergoes modifications or updates, on the development environment, based on updates to the development application at points in time along a timeflow associated with the application specific data (e.g., application timeflow 1). Snapshots of the virtual application and changes to the virtual application (e.g., corresponding to changes in the associated source application, for instance in the development environment) are captured and stored at a subset of time points (e.g., $T_0$, $T_1$, $T_2$, $T_3$, and the like) along application timeflow 1. In some embodiments, snapshots associated with the virtual application (corresponding to changes in the source application)

and information corresponding to the application timeflow are stored in a container (e.g., application container shown in FIG. 8a).

Responsive to a user request to concurrently or synchronously rollback or rewind the VDB and the virtual application to a user-specified prior time point (e.g., rollback point $T_{RB}$, corresponding to time $T_4$), as shown in FIG. 8a, database storage system 100 clones the application snapshot (e.g., application snapshot 5) and the VDB snapshots (VDB Snapshot 2) captured at the user-specified time point.

Database storage system 100 then creates a new timeflow for the application (e.g., app timeflow 2) and the VDB (e.g., VDB timeflow 2) within the same respective application and VDB containers and provisions the same application and VDB, respectively, from the new application and VDB timeflows originating at the user-specified prior time point (e.g., rollback point $T_{RB}$, corresponding to time $T_4$).

Toward this end, in some embodiments, the database storage system 100 temporarily shuts down the VDB (e.g., suspends user access to the VDB), creates new VDB and application timeflows within the same VDB and application containers (e.g., VDB Timeflow 2 within VDB container and app timeflow 2 within the application container), points the destination storage to the new timeflows and brings up the same original VDB provisioned from the new VDB timeflow (e.g., from VDB Timeflow 2).

Database storage system 100 then tracks changes to the VDB and the application specific data at the development environment (e.g., by capturing and maintaining VDB and application snapshots, and VDB transaction log files between VDB snapshots) along the new VDB and application timeflows, respectively.

Figure 8B:
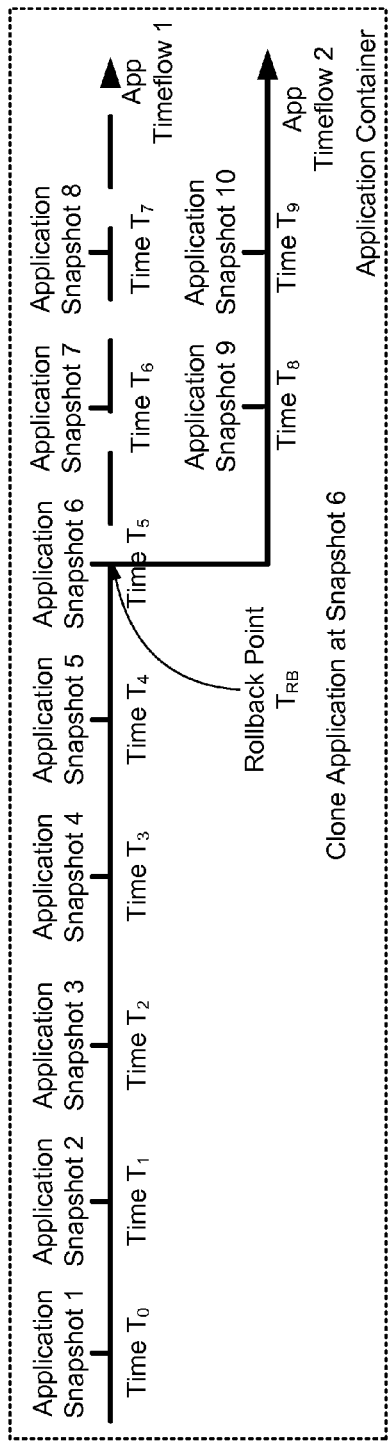
FIG. 8b illustrates an approach to rewinding a virtual database and a virtual application, at the development environment, to a user-specified time point at which a snapshot of the virtual application exists, but a snapshot of the virtual database does not, according to some embodiments.
Figure 8B:
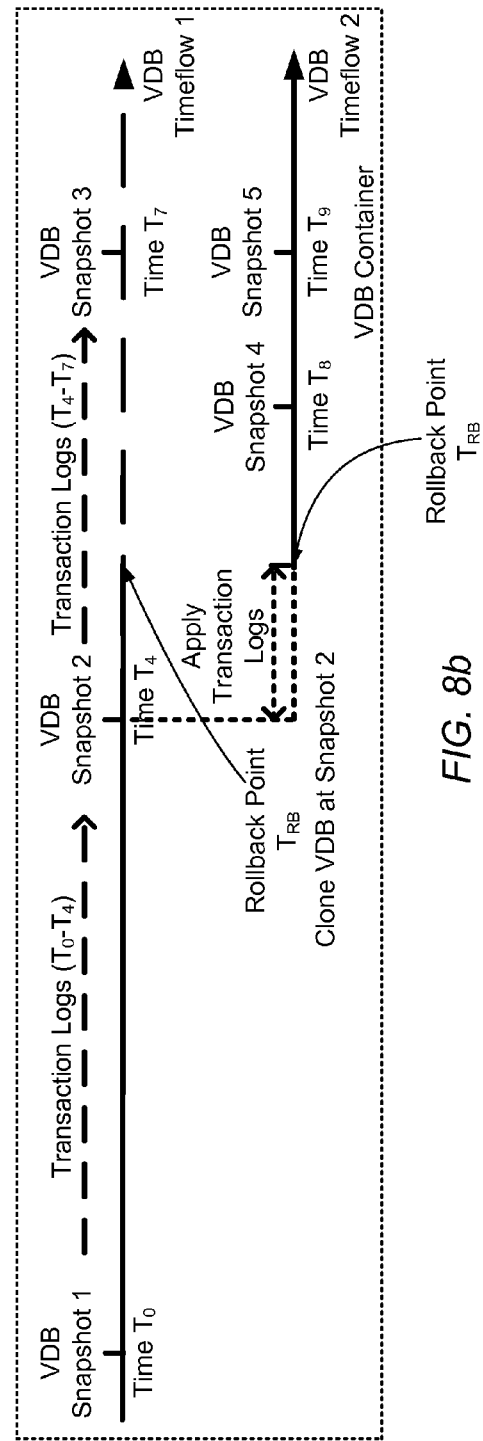

FIG. 8b illustrates an approach to rewinding a virtual database and a virtual application to a user-specified time point at which a snapshot of the virtual application exists, but a snapshot of the virtual database does not, according to some embodiments.

As shown in FIG. 8b, responsive to a user request to concurrently rollback or rewind the virtual database and the virtual application to a prior user-specified time point (e.g., rollback time $T_{RB}$), at which a snapshot of the application specific data exists (e.g., application snapshot 6), but a snapshot of the virtual database does not, database storage system 100 retrieves or accesses the nearest prior VDB snapshot (e.g., VDB snapshot 2 at time $T_4$) and clones the VDB at snapshot 2, applies transaction log files between $T_4$ and the requested rollback point $T_{RB}$ to create a representation of the VDB files at the rollback point $T_{RB}$.

Database storage system 100 then creates a new VDB timeflow (e.g., VDB Timeflow 2) originating at $T_{RB}$. Since the application snapshots are captured at the development environment at a higher frequency (e.g., at average intervals of approximately 30 seconds, 1 minute, 5 minutes, 1 hour, and the like), an application snapshot at the requested rollback point or in close temporal proximity to the requested rollback point (e.g., application data snapshot matched to the time the VDB is being provisioned from) exists along the application timeflow (application snapshot 6 exists at the requested rollback point $T_{RB}$ along application timeflow 1), and database storage system 100 clones the application at the application snapshot at the requested rollback point and creates a new application timeflow (e.g., application timeflow 2) originating at the rollback point.

Figure 9:
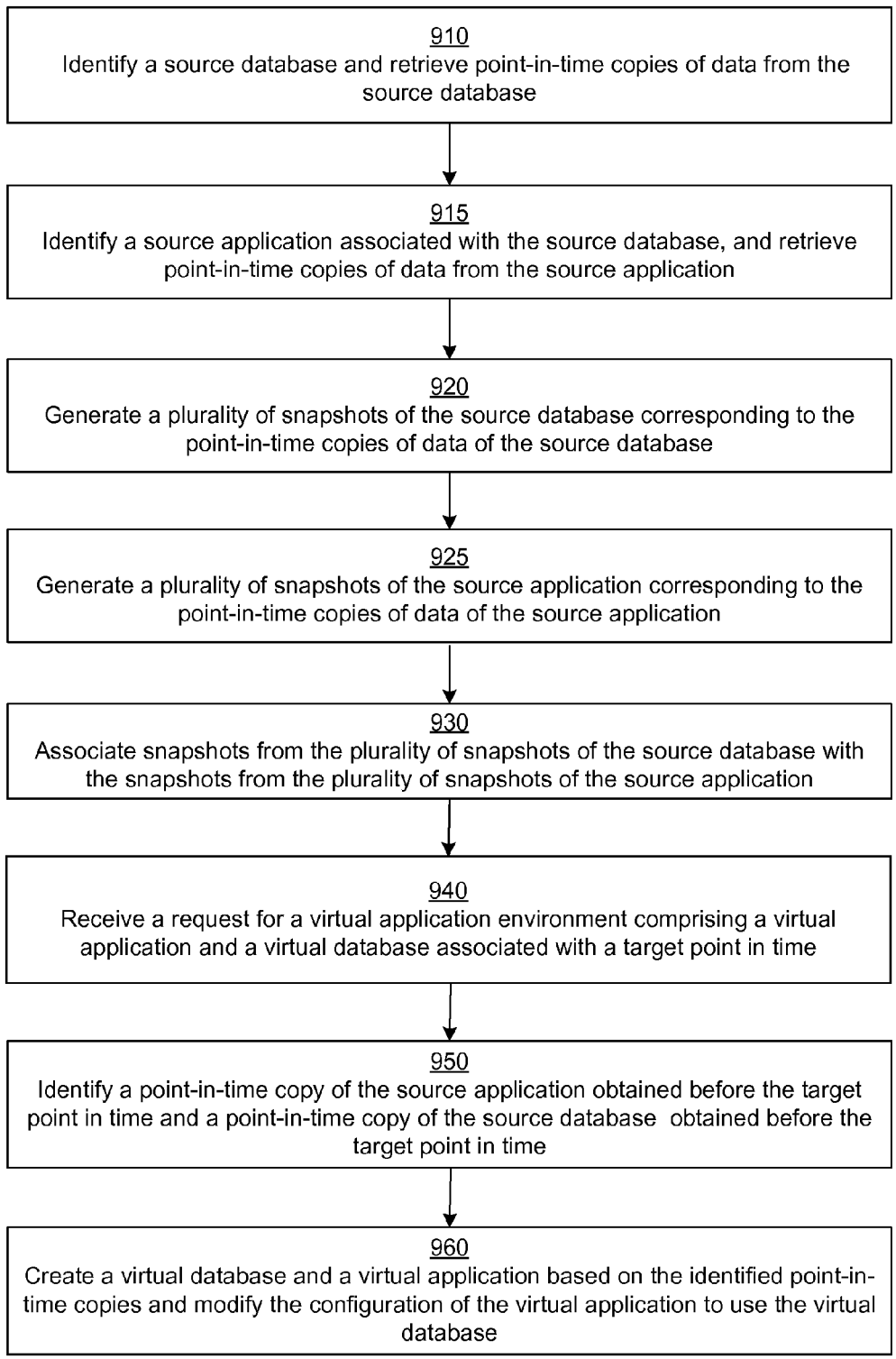
FIG. 9 includes a flowchart of a process for creating snapshots of a virtual database and a virtual application and, optionally, rewinding or rolling back the virtual database or the virtual application to a user-specified time point, according to some embodiments.

FIG. 9 includes a flowchart of a process for creating snapshots of a virtual database and a virtual application and, optionally, rewinding or rolling back the virtual database or the virtual application to a user-specified time point, according to some embodiments.

Database storage system 100 identifies (910) a source database (e.g., production database system 520a, FIG. 5a) and retrieves point-in-time copies of data from the source database. Database storage system 100 identifies (915) a source application (e.g., production application 540a, FIG. 5a) associated (560a, FIG. 5a) with the source database and retrieves point-in-time copies of data from the source application.

Database storage system 100 generates (920) a plurality of snapshots of the virtual database at a corresponding plurality of time points (e.g., VDB snapshot 1 at time $T_0$, VDB snapshot 2 at time $T_4$, VDB snapshot 3 at time $T_7$, as shown in FIG. 7). The snapshots store data obtained from the source database in a storage efficient manner such that some of the stored data blocks are associated with multiple point-in-time copies of the source database.

Database storage system 100 generates (925) a plurality of snapshots of the virtual application at a plurality of time points (e.g., application snapshot 1 at time $T_0$, application snapshot 5 at time $T_4$, application snapshot 8 at time $T_7$, as shown in FIG. 7), based on one or more inputs received from the one or more development environments (e.g., a user initiating a provision operation). The snapshots store data obtained from the source database in a storage efficient manner such that some of the stored data blocks are associated with multiple point-in-time copies of the source database.

In an embodiment, database storage system 100 associates (930) the plurality of snapshots of the source database with the plurality of snapshots of the source application at the corresponding plurality of time points (e.g., as explained with reference to FIG. 7). In other embodiments, a snapshot of the source database gets associated with a snapshot of the source application upon request to generate a virtual application environment.

The database storage system 100 receives 940 a request to create a virtual application environment for a target point-in-time such that the virtual application environment matches a state of the source application environment corresponding to the target point-in-time. The database storage system 100 identifies 950 a point-in-time copy of the source application obtained before the target point in time. The database storage system 100 also identifies 950 a point-in-time copy of the source database obtained before the target point in time. The database storage system 100 creates 960 a virtual database and a virtual application based on the identified point-in-time copies and modifies the configuration of the virtual application to use the virtual database. The combination of the virtual application and the virtual database is provided as the virtual application environment. In some embodiments, identifying the point-in-time copy of the source application comprises selecting the latest point-in-time copy of the source application obtained before the target point in time and identifying the point-in-time copy of the source database comprises selecting the latest point-in-time copy of the source database obtained before the target point in time.

In an embodiment, and the virtual application comprises a set of files linked to data blocks associated with the identified point-in-time copy of the source application. Similarly, the virtual database comprising a set of files linked to data blocks associated with the identified point-in-time copy of the source database. The database storage system 100 mounts the set of files of the virtual application and the set of files of the virtual database on one or more target servers.

The database storage system 100 provides access to the sets of files to the target servers. In some embodiment, the set of files of the virtual application may be mounted on one target server and the set of files of the virtual database may be mounted on another target server. In other embodiments, both the set of files of the virtual application and the set of files of the virtual database may be mounted on the same target server.

In some embodiments, modifying the configuration of the virtual application to access the virtual database comprises executing a script configured to update the configuration of the virtual application to refer to the virtual database instead of the source database. The database storage system 100 may execute scripts that start one or more processes of the virtual application. The database storage system may receive subsequent requests to create other virtual application environments for the source application and source database, for example, other virtual databases for the same target point in time or for different target points in time. The virtual databases may share the data blocks of the virtual database with other virtual databases. Similarly, the virtual application may share the data blocks of the virtual application with other virtual applications.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to these signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still cooperate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for creating virtual application environments from point-in-time copies of production databases and production applications stored in a storage manager. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

We claim:

1. A method for creating a virtual application environment, the method comprising:
receiving different point-in-time copies of a source application environment, wherein an application environment comprises an application configured to access a database, the receiving comprising:
receiving different point in time copies of the source application, and
receiving different point in time copies of the source database;
storing on a database storage system, data blocks for a plurality of different point-in-time copies of the source application, wherein at least some of the stored data blocks are associated with multiple point-in-time copies of the source application;
storing on the database storage system, data blocks for a plurality of different point-in-time copies of the source database, wherein at least some of the stored data blocks are associated with multiple point-in-time copies of the source database;
receiving a request to create a virtual application environment for a target point-in-time, the virtual application environment matching a state of the source application environment corresponding to the target point-in-time;
identifying a point-in-time copy of the source application stored in the database storage system and obtained before the target point-in-time and creating a virtual application comprising a first set of files linked to data blocks associated with the identified point-in-time copy of the source application;
identifying a point-in-time copy of the source database stored in the database storage system and obtained before the target point-in-time and creating a virtual database comprising a second set of files linked to data blocks associated with the identified point-in-time copy of the source database;

mounting the first set of files and the second set of files on one or more target servers, and providing access to the first set of files and the second set of files to the corresponding target servers; and modifying the configuration of the virtual application to access the virtual database.

2. The method of claim 1, wherein modifying the configuration of the virtual application to access the virtual database comprises executing a script configured to update the configuration of the virtual application to refer to the virtual database instead of the source database.

3. The method of claim 2, wherein executing the script further starts a process of the virtual application.

4. The method of claim 1, wherein the point in time copies of the source application are received at a first rate and the point-in-time copies of the source database are received at a second rate different from the first rate.

5. The method of claim 1, wherein the virtual application is mounted on a first target server and the virtual database is mounted on a second target server.

6. The method of claim 1, wherein both the virtual application and the virtual database are mounted on a target server.

7. The method of claim 1, wherein identifying the point-in-time copy of the source application comprises selecting the latest point-in-time copy of the source application obtained before the target point in time and identifying the point-in-time copy of the source database comprises selecting the latest point-in-time copy of the source database obtained before the target point in time.

8. The method of claim 1, wherein the virtual application environment is a first virtual application environment, the request to create a virtual application environment is a first request to create a virtual application environment, the target point-in-time is a first target point-in-time, the point-in-time copy of the source application is the first point-in-time copy of the source application, the point-in-time copy of the source database is the first point-in-time copy of the source database, the virtual application is the first virtual application, the virtual database is a first virtual database, the method further comprising:

receiving a second request to create a virtual application environment for a second target point-in-time, the virtual application environment matching a state of the source application environment corresponding to the second target point-in-time;

identifying a second point-in-time copy of the source application stored in the database storage system and obtained before the second target point-in-time and creating a second virtual application comprising a third set of files linked to the data blocks associated with the identified second point-in-time copy of the source application;

identifying a second point-in-time copy of the source database stored in the database storage system and obtained before the second target point-in-time and creating a second virtual database comprising a fourth set of files linked to the data blocks associated with the identified second point-in-time copy of the source database;

mounting the third set of files associated with the second virtual application and the fourth set of files associated with the second virtual database on another one or more target servers, and providing access to the third set of files and the fourth set of files to the corresponding target servers; and modifying the configuration of the second virtual application to access the second virtual database.

9. The method of claim 1, wherein the virtual database shares one or more data blocks with other virtual databases and the virtual application shares one or more data blocks with other virtual applications.

10. The method of claim 1, wherein receiving point-in-time copies of the virtual application comprises receiving data blocks storing executable files of the source application.

11. The method of claim 1, wherein receiving point-in-time copies of the virtual application comprises receiving data blocks storing application specific data of the source application, wherein the application specific data is stored outside the source database.

12. The method of claim 1, wherein receiving point-in-time copies of the virtual application comprises receiving data blocks storing configuration data of the source application, wherein the configuration data is stored outside the source database.

13. The method of claim 1, wherein the target point-in-time is a first target point-in-time, the point-in-time copy of the source application is the first point-in-time copy of the source application, the point-in-time copy of the source database is the first point-in-time copy of the source database, the method further comprising:

receiving a request to perform a rewind operation on the virtual application environment, the request identifying a second target point in time occurring before the first point in time;

identifying a second point-in-time copy of the source application stored in the database storage system and obtained before the second target point-in-time and modifying the virtual application to link to data blocks associated with the identified second point-in-time copy of the source application; and identifying a second point-in-time copy of the source database stored in the database storage system and obtained before the second target point-in-time and modifying the virtual database to link to data blocks associated with the identified second point-in-time copy of the source database.

14. The method of claim 13, further comprising:

stopping execution of the virtual application environment before modifying the virtual application to link to data blocks associated with the identified second point-in-time copy of the source application and modifying the virtual database to link to data blocks associated with the identified second point-in-time copy of the source database; and restarting execution of the virtual application environment after modifying the virtual application to link to data blocks associated with the identified second point-in-time copy of the source application and modifying the virtual database to link to data blocks associated with the identified second point-in-time copy of the source database.

15. The method of claim 13, further comprising:

creating a timeflow corresponding to the second target point in time, the timeflow comprising a history of modifications made to the virtual database of the virtual application environment.

16. The method of claim 1, further comprising:
receiving transaction logs from the source database, the transaction logs representing updates performed on the source database; and
applying one or more transaction logs to update data blocks of the identified point-in-time copy of the source database stored in the database storage system, the data blocks updated before creating the virtual database.

17. The method of claim 1, wherein the target point in time is a first target point-in-time, the point-in-time copy of the source application is the first point-in-time copy of the source application, the point-in-time copy of the source database is the first point-in-time copy of the source database, the method further comprising:
receiving a request to perform a refresh operation on the virtual application environment, the request identifying a second target point in time occurring after the first point in time;
identifying a second point-in-time copy of the source application stored in the database storage system and obtained before the second target point-in-time and modifying the virtual application to link to data blocks associated with the identified second point-in-time copy of the source application; and
identifying a second point-in-time copy of the source database stored in the database storage system and obtained before the second target point-in-time and modifying the virtual database to link to data blocks associated with the identified second point-in-time copy of the source database.

18. The method of claim 17, wherein the second target point in time corresponds to a current point in time and the second point-in-time copy of the source application corresponds to the latest point-in-time copy of the source application received and the second point-in-time copy of the source database corresponds to the latest point-in-time copy of the source database received.

19. A non-transitory computer readable storage medium storing instructions for:
receiving different point-in-time copies of a source application environment, wherein an application environment comprises an application configured to access a database, the receiving comprising:
receiving different point in time copies of the source application, and
receiving different point in time copies of the source database;
storing on a database storage system, data blocks for a plurality of different point-in-time copies of the source application, wherein at least some of the stored data blocks are associated with multiple point-in-time copies of the source application;
storing on the database storage system, data blocks for a plurality of different point-in-time copies of the source database, wherein at least some of the stored data blocks are associated with multiple point-in-time copies of the source database;
receiving a request to create a virtual application environment for a target point-in-time, the virtual application environment matching a state of the source application environment corresponding to the target point-in-time;
identifying a point-in-time copy of the source application stored in the database storage system and obtained before the target point-in-time and creating a virtual application comprising a first set of files linked to data blocks associated with the identified point-in-time copy of the source application;
identifying a point-in-time copy of the source database stored in the database storage system and obtained before the target point-in-time and creating a virtual database comprising a second set of files linked to data blocks associated with the identified point-in-time copy of the source database;
mounting the first set of files and the second set of files on one or more target servers, and providing access to the first set of files and the second set of files to the corresponding target servers; and
modifying the configuration of the virtual application to access the virtual database.

20. A computer system comprising:
a computer processor; and
non-transitory computer readable storage medium storing instructions for:
receiving different point-in-time copies of a source application environment, wherein an application environment comprises an application configured to access a database, the receiving comprising:
receiving different point in time copies of the source application, and
receiving different point in time copies of the source database;
storing on a database storage system, data blocks for a plurality of different point-in-time copies of the source application, wherein at least some of the stored data blocks are associated with multiple point-in-time copies of the source application;
storing on the database storage system, data blocks for a plurality of different point-in-time copies of the source database, wherein at least some of the stored data blocks are associated with multiple point-in-time copies of the source database;
receiving a request to create a virtual application environment for a target point-in-time, the virtual application environment matching a state of the source application environment corresponding to the target point-in-time;
identifying a point-in-time copy of the source application stored in the database storage system and obtained before the target point-in-time and creating a virtual application comprising a first set of files linked to data blocks associated with the identified point-in-time copy of the source application;
identifying a point-in-time copy of the source database stored in the database storage system and obtained before the target point-in-time and creating a virtual database comprising a second set of files linked to data blocks associated with the identified point-in-time copy of the source database;
mounting the first set of files and the second set of files on one or more target servers, and providing access to the first set of files and the second set of files to the corresponding target servers; and
modifying the configuration of the virtual application to access the virtual database.

\* \* \* \* \*